United States Patent
Ahn et al.

(10) Patent No.: US 10,454,535 B2
(45) Date of Patent: Oct. 22, 2019

(54) APPARATUS AND METHOD FOR RECEIVING SIGNAL IN WIRELESS COMMUNICATION SYSTEM

(71) Applicant: Samsung Electronics Co., Ltd, Suwon-si (KR)

(72) Inventors: Seok-Ki Ahn, Suwon-si (KR); Sungho Chae, Seoul (KR); Kwang Taik Kim, Yongin-si (KR); Young-Han Kim, La Jolla, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/891,146

(22) Filed: Feb. 7, 2018

(65) Prior Publication Data
US 2018/0227020 A1 Aug. 9, 2018

(30) Foreign Application Priority Data
Feb. 7, 2017 (KR) .................. 10-2017-0016776

(51) Int. Cl.
*H04B 7/0413* (2017.01)
*H04B 7/08* (2006.01)
*H04L 25/03* (2006.01)

(52) U.S. Cl.
CPC ......... *H04B 7/0413* (2013.01); *H04B 7/0854* (2013.01); *H04L 25/03006* (2013.01)

(58) Field of Classification Search
CPC .................................................. H04B 7/0413
(Continued)

(56) References Cited

U.S. PATENT DOCUMENTS

| | | | |
|---|---|---|---|
| 2008/0152032 A1* | 6/2008 | Lee | H04B 7/0854 375/260 |
| 2012/0300828 A1* | 11/2012 | Erez | H04L 1/0059 375/230 |

(Continued)

FOREIGN PATENT DOCUMENTS

| | | |
|---|---|---|
| KR | 10-2017-0121444 A | 11/2017 |
| KR | 10-2017-0127810 A | 11/2017 |

OTHER PUBLICATIONS

Jiening Zhan et al., "Integer-Forcing Linear Receivers", IEEE Transactions on Information Theory, vol. 60, Issue 12, Dec. 2014, date of publication Oct. 8, 2014, 26 pages.

(Continued)

*Primary Examiner* — Lihong Yu

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to various embodiments, in a multiple-input multiple-output wireless communication system, a receiving apparatus may include at least one processor and at least one transceiver. The at least one transceiver may be configured to receive a signal including a plurality of symbols, perform Successive Interference Cancellation (SIC) related to a first symbol of the plurality of symbols on the received signal to obtain a processed signal, determine symbol-sums by applying an equalization matrix for integer forcing to the processed signal, and determine information words corresponding to the plurality of symbols based on the symbol-sums.

20 Claims, 13 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2012/0321017 A1* | 12/2012 | Lee ..................... | H04B 7/0639 375/296 |
| 2017/0311331 A1 | 10/2017 | Chae et al. | |
| 2017/0331589 A1 | 11/2017 | Jang et al. | |

OTHER PUBLICATIONS

Tae-Ho Im et al., "Mmse-OSIC2 Signal Detection for Spatially Multiplexed MIMO Systems", IEEE Vehicular Technology Conference, May 11-14, 2008, 5 pages.

Sung Ho Chae et al., "Multilevel Coding Scheme for Integer-Forcing MIMO Receivers With Binary Codes", IEEE Transactions on Wireless Communications, vol. 16, No. 8, Aug. 2017, 14 pages.

* cited by examiner

APPARATUS AND METHOD FOR RECEIVING SIGNAL IN WIRELESS COMMUNICATION SYSTEM

CROSS-REFERENCE TO RELATED APPLICATION(S)

This application is based on and claims priority under 35 U.S.C. § 119 to Korean Patent Application No. 10-2017-0016776, filed on Feb. 7, 2017, in the Korean Intellectual Property Office, the disclosure of which is incorporated by reference herein in its entirety.

TECHNICAL FIELD

The present disclosure generally relates to a wireless communication system and, more particularly, to an apparatus and method for detecting signals in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the present disclosure. No determination has been made, and no assertion is made, as to whether any of the above might be applicable as prior art with regard to the present disclosure.

Recently, with the rapid increase in data traffic, various MIMO transmission/reception schemes have been proposed to increase frequency efficiency and a transmission rate. As the MIMO transmission/reception schemes, linear techniques such as Zero Forcing (ZF) and Minimum Mean Squared Error (MMSE) or nonlinear techniques such as Maximum Likelihood (ML) and sphere decoding have been considered, but there are defects in that, although capability is high, complexity is also high in the nonlinear techniques, and although complexity is relatively low in linear techniques, capability is insufficient in comparison to nonlinear techniques. Further, when a channel variation is large, the operational capability of a transceiver may be deteriorated, depending on the MIMO transmission/reception schemes. Accordingly, there is need for a transmission/reception scheme that has capability close to that of the nonlinear schemes, and can have a high gain even though channel variation is large.

SUMMARY

On the basis of the above description, the present disclosure provides an apparatus and method for effectively receiving signals, using an Integer Forcing (IF) solution in a MIMO wireless communication system.

Further, the present disclosure provides an apparatus and method for improving decoding capability even in an environment with a large channel variation, using an IF technique and other detection techniques in a MIMO wireless communication system.

Further, the present disclosure provides an apparatus and method for adaptively determining a transmission/reception scheme according to channel change, through signaling between a terminal and a base station in a MIMO wireless communication system.

According to various embodiments, in a multiple-input multiple-output wireless communication system, a receiving apparatus may include at least one processor and at least one transceiver. The at least one transceiver may be configured to receive a signal including a plurality of symbols, perform Successive Interference Cancellation (SIC) related to a first symbol of the plurality of symbols, on the received signal to obtain a processed signal, determine symbol-sums by applying an equalization matrix for integer forcing to the processed signal, and determine information words corresponding to the plurality of symbols based on the symbol-sums.

According to various embodiments, a method of operating a receiving apparatus in a multiple-input multiple-output wireless communication system may include: receiving a signal including a plurality of symbols; performing SIC related to a first symbol of the plurality of symbols on the received signal to obtain a processed signal; determining symbol-sums by applying an equalization matrix for integer forcing to the processed signal; and determining information words corresponding to the plurality of symbols based on the symbol-sums.

The apparatus and method according to various embodiments can maintain high capability even if channel change is large, by combining Integer Forcing (IF) solution and Successive Interference Cancellation (SIC).

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
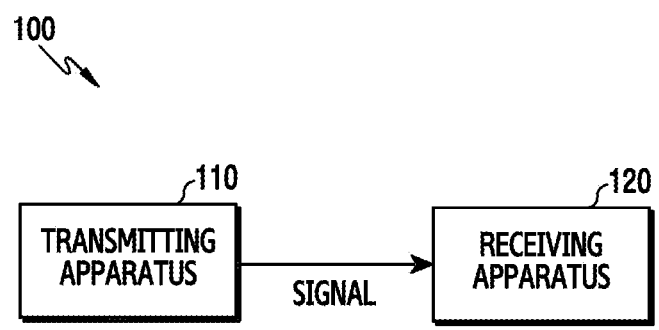
FIG. 1 shows a wireless communication environment according to various embodiments.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure relates to an apparatus and method for decoding signals in a wireless communication system. In detail, the present disclosure proposes operations for providing high capabilities even though channel change is large, by detecting and then decoding symbol-sums, using an Integer Forcing (IF) scheme and a Successive Interference Cancellation (SIC) scheme.

In the following description, terms indicating control information, terms indicating calculation states (for example, "step", "operation", and "procedure"), terms indicating data (for example, "information", "bit", "symbol", and "codeword"), terms indicating network entities (for example, "base station", "5GNB", "transmitting apparatus", "receiving apparatus"), terms indicating messages (for example, "signal", "data", "signaling", "symbol", and "stream"), terms indicating components of an apparatus, etc. are used by way of example for convenience of description. Accordingly, the present disclosure is not limited to the terms to be described hereinafter, and other terms having equivalent meanings may be used.

Further, the present disclosure describes various embodiments, using terminologies that are used in some communication standards (for example, a Long Term Evolution (LTE) system and an LTE-Advanced (LTE-A) system), but they are only examples. Various embodiments of the present disclosure may be easily modified for application to other communication systems. The present disclosure is exemplified by a unidirectional configuration for the convenience of description, but the apparatus and method according to various embodiments may also be applied to a bidirectional configuration.

FIG. 1 shows a wireless communication environment 100 according to various embodiments. The wireless communication environment 100 may include a transmitting apparatus 110 and a receiving apparatus 120.

Referring to FIG. 1, the transmitting apparatus 110 can transmit a signal to the receiving apparatus 120. The receiving apparatus 120 can support a plurality of algorithms to decode the signal. For example, the receiving apparatus 120 can support at least one of Maximum Likelihood (ML), Zero Forcing (ZF), Minimum Mean Square Error (MMSE), MMISE-SIC, and an IF techniques. The IF technique may be an algorithm based on integer conversion of an effective channel matrix. The receiving apparatus 120 can select one of a plurality of receiver algorithms on the basis of control information and setting information of the receiving apparatus 120 or information measured by the transmitting apparatus 110, and use the selected information to process received data.

The transmitting apparatus 110 and the receiving apparatus 120 are defined on the basis of the transmission direction of the signal. Accordingly, one device may operate as the transmitting apparatus 110 or the receiving apparatus 120, depending on cases. For example, the transmitting apparatus 110 may be a base station and the receiving apparatus 120 may be a terminal in downlink communication. Alternatively, the transmitting apparatus 110 may be a terminal and the receiving apparatus 120 may be a base station in uplink communication. Further, the transmitting apparatus 110 may be a terminal and the receiving apparatus 120 may be a base station in Device-to-Device (D2D) communication. D2D communication may be referred to as sidelink communication. Further, the transmitting apparatus 110 may be a base station and the receiving apparatus 120 may be another base station. Other than the examples, the transmitting apparatus 110 and the receiving apparatus 120 may be other various devices.

A base station is a network infrastructure that provides wireless connection to a terminal. The base station may be referred to, other than the term 'base station', as an Access Point (AP), an eNodeB (eNB), a 5G node ($5^{th}$ generation node), a $5^{th}$ generation NodeB (5GNB), a wireless point, a Transmission/Reception Point (TRP), or other terms having technical meanings equivalent to these terms.

The terminal, which is a device that is used by a user, communicates with the base station through a wireless channel. The terminal may be referred to, other than the term 'terminal', as User Equipment (UE), a mobile station, a subscriber station, a remote terminal, a wireless terminal, an electronic device, or a user device, or other terms having equivalent technical meanings as these terms.

Signals that the receiving apparatus 120 receives can be expressed as the following Equation 1.

$$Y=HX+Z \qquad \text{Equation 1}$$

where Y is a signal that the receiving apparatus 120 receives and X is a signal that the transmitting apparatus 110 transmits. H is channels between the transmitting apparatus 110 and the receiving apparatus 120. Z is noise between the channels. When the transmitting apparatus 110 includes $N_T$ antennas and the receiving apparatus 120 includes $N_R$ antennas, X may be a vector of magnitude $N_T \times 1$, Y and Z may be $N_R \times 1$ vectors, and H may be an $N_R \times N_T$ matrix.

In the following description referring to FIGS. 2 to 14, a transmitting apparatus and a receiving apparatus are separately described, but this is only for the convenience of description and the functions of the devices are not limited by the terms. In other words, the receiving apparatus 120 may transmit not only control information, but data to a transmitting apparatus, if necessary.

Figure 2:
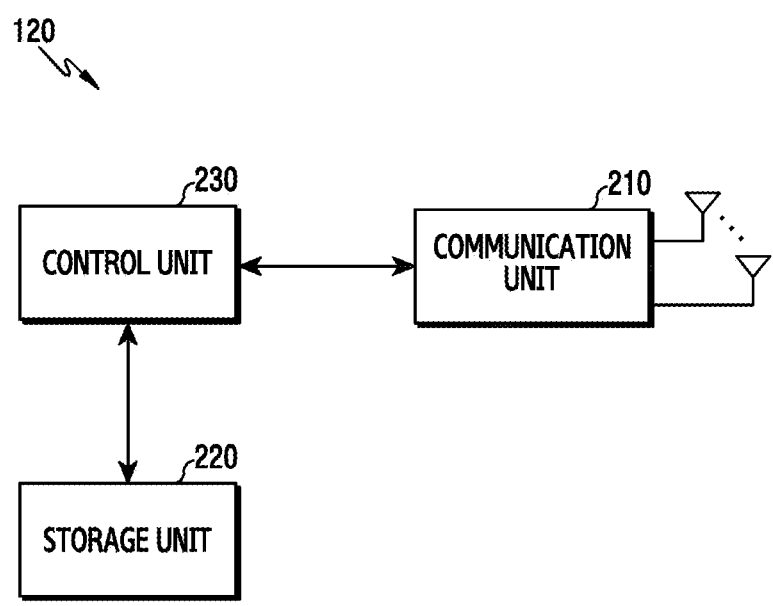
FIG. 2 shows the functional configuration of a receiving apparatus in a wireless communication system according to various embodiments.

FIG. 2 shows the functional configuration of the receiving apparatus 120 in a wireless communication system according to various embodiments. The configuration exemplified in FIG. 2 may be understood as the configuration of the receiving apparatus 120 shown in FIG. 1. The suffixes "~unit", "~er", etc. used hereafter mean units for processing at least one function or operation and may be implemented by hardware, software, or a combination of hardware and software. Further, as described above, since the functions of devices are not limited by terms, not only a configuration allowing the receiving apparatus 120 to receive signals from the transmitting apparatus 110 shown in FIG. 1, but a configuration allowing the receiving apparatus 120 to transmit signals to the transmitting apparatus 110 is included in the following description.

Referring to FIG. 2, the receiving apparatus 120 may include a communication unit 210, a storage unit 220, and a control unit 230.

The communication unit 210 performs functions for transmission/reception signals through wireless channels. For example, the communication unit 210 can convert baseband signals and bit sequences into each other in accordance with the physical layer specifications of a system. For example, when transmitting control information, the communication unit 210 can generate modulated symbols by encoding and modulating transmission bit sequences. When receiving data, the communication unit 210 can restore received bit sequences by demodulating and decoding baseband signals. Further, the communication unit 210 can up-convert baseband signals into Radio Frequency (RF) band signals and then transmit the converted signals through an antenna, and can down-convert RF band signals received through the antenna into baseband signals. For example, the communication unit 210 may include a decoder, a demodulator, an Analog-to-Digital Converter (ADC), a receiving filter, an amplifier, a mixer, an oscillator, etc. When the communication unit 210 receives signals, it may additionally include an encoder, a modulator, a Digital-to-Analog Converter (DAC), a transmitting filter, etc.

The communication unit 210 may include a plurality of antennas. The communication unit 210 can receive a plurality of streams through the antennas. Further, the communication unit 210 may include a plurality of RF chains. Further, the communication unit 210 can perform beamforming. For the beamforming, the communication unit 210 can adjust the phases and magnitudes of signals transmitted and received through a plurality of antennas or antennal elements, that is, can perform analog beamforming. Alternatively, the communication unit 210 can perform beamforming on digital signals, that is, can perform digital beamforming.

The communication unit 210 may include different communication modules for processing signals in different frequency bands. Further, the communication unit 210 may include a plurality of communication modules to support a plurality of different wireless connection solutions. For example, the different wireless connection technologies may include Bluetooth Low Energy (BLE), Wireless Fidelity (Wi-Fi), Wi-Fi Gigabyte (WiGig), cellular networks (for example, LTE, LTE-A, and 5G (5th generation) networks), etc. The different frequency bands may include Super High-Frequency (SHF) bands (for example, 2.5 GHz and 5 GHz) and millimeter wave bands (for example, 30 GHz and 60 GHz).

The communication unit 210 transmits and receives signals, as described above. Accordingly, the communication unit 210 may be referred to as a transmitter, a receiver, or a transceiver. Transmission and reception that are performed through wireless channels are used as meanings that include the above-mentioned processing performed by the communication unit 210.

The storage unit 220 can store data such as basic programs, applications, and setting information for operation of the receiving apparatus 120. The storage unit 220 may be a volatile memory, a nonvolatile memory, or a combination of a volatile memory and a nonvolatile memory. The storage unit 220 can provide the stored data in response to a request from the control unit 230.

The control unit 230 can control the overall operation of the receiving apparatus 120. For example, the control unit 230 can transmit and receive signals through the communication unit 210. The control unit 230 can write and read data to and from the storage unit 220. To this end, the control unit 230 may include at least one processor or microprocessor, or may be configured as a part of a processor. A portion of the communication unit 210 and the control unit 230 may be referred to as a Communication Processor (CP). In particular, the control unit 230, depending on various embodiments to be described below, can detect symbols received from the transmitting apparatus 110 on the basis of a receiver algorithm, and can decode signals. The control unit 230 may include at least one of a calculator that performs calculation, an equalizer, and a detector. The calculator, equalizer, and detector, which are instruction sets or codes stored in the storage unit 220, may be instructions/codes temporarily resided in the control unit 230 or storage spaces for storing instructions/codes, or portions of a circuitry constituting the control unit 230.

The calculator can, depending on setting, determine an integer matrix of an IF technique from a channel matrix or symbol-sums according to an integer matrix. The control unit 230 can control the receiving apparatus 120 to perform operations according to various embodiments to be described below. The equalizer can remove or reduce noise in signals received through the communication unit 210 or Inter-Symbol Interference (ISI). The detector can detect the values of received symbols. Further, the detector can perform decisions (for example, a hard decision and a soft decision) from probabilities about bit values. Further, the detector can decode codewords.

FIG. 2 shows an exemplary configuration of the receiving apparatus 120. When the configuration shown in FIG. 2 is the configuration of a base station, a backhaul communication unit that provides an interface for communicating with a backhaul network may be further included.

In the description referring to FIGS. 1 and 2, an environment for receiving signals and the configuration of a device for receiving signals were described. Hereafter, an IF decoding solution and an IF detection solution based on IF are described with reference to FIGS. 3A and 3B and terms for the IF technique are defined.

Figure 3A:
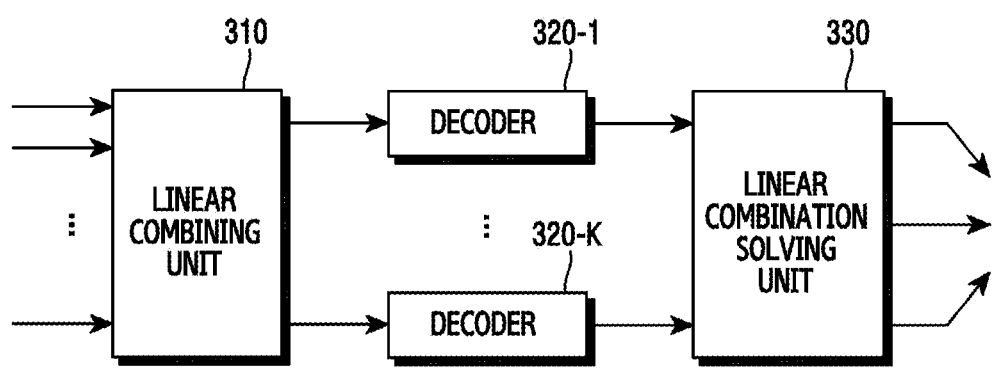
FIG. 3A shows the functional configuration of a control unit for Integer-Forcing (IF) decoding in a wireless communication system according to various embodiments.

FIG. 3A shows a functional configuration of the communication unit 210 for IF decoding in a wireless communication system according to various embodiments.

Referring to FIG. 3A, the communication unit 210 may include a linear combining unit 310, decoders 320-1 to 320-K, and a linear combination solving unit 330. The linear combining unit 310 may be referred to as a 'linear equalizer' and the linear combination solving unit 330 may be referred to as a 'linear equation solving unit'.

The linear combining unit 310 can multiply signals received through wireless channels of a plurality of antennas by an equalization matrix. The linear combining unit 310 can determine an equalization matrix on the basis of a channel matrix, a channel quality, etc., or can be provided with an equalization matrix from another block in the receiving apparatus 120.

$$\tilde{Y}=BY \qquad \text{Equation 2}$$

B is an equalization matrix, Y is a received signal, and $\tilde{Y}$ is an equalized signal. For example, when signals transmitted through four transmitting antennas are received through four receiving antennas, the receiving apparatus 120 can receive four (transmitting) streams. Y and $\tilde{Y}$ in Equation 2 can be expressed as a 4×1 vector. Further, B can be expressed as a 4×4 matrix. The receiving apparatus 120 receives different streams through respective antennas, but detection and decoding are performed in units of a codeword, so the operation of the receiving apparatus 120 is described hereafter in units of a codeword.

Received signals can be expressed as the following Equation 3 by combining Equations 1 and 2.

$$\tilde{Y}=BHX+BZ \qquad \text{Equation 3}$$

where $\tilde{Y}$ is an equalized signal. B is an equalization matrix, X is a signal that is transmitted by the transmitting apparatus 110, and H is channels between the transmitting apparatus 110 and the receiving apparatus 120. Z is noise between the channels.

The linear combining unit 310 can determine 'integer-valued effective channel matrix' for IF decoding. The 'integer-valued effective channel matrix' is referred to as an integer matrix hereafter for the convenience of description. The linear combining unit 310 can determine an integer matrix for minimizing effective noise in the equalized signal. The integer matrix may be determined into a full-rank matrix. This is because an inverse matrix of A is used to solve a linear combination, as in Equation 6 to be described below. The linear combining unit 310 can separate the codeword term and the effective noise term in Equation 3 on the basis of the determined integer matrix.

$$\tilde{Y}=AX+\{(BH-A)X+BZ\} \qquad \text{Equation 4}$$

where $\tilde{Y}$ is an equalized signal. A is an integer matrix, X is a signal that is transmitted by the transmitting apparatus 110, B is an equalization matrix, and H is channels between the transmitting apparatus 110 and the receiving apparatus 120. Z is noise between the channels.

In Equation 4, AX may be a codeword term and {(BH−A)X+BZ} may be an effective noise term. The codeword term, which is a combined codeword, means a state in which at least some of codewords received through a plurality of antennas have been linearly summed. The combined codeword is referred to as a summed codeword hereafter.

When X is expressed on the basis not of a codeword, but of a symbol, AX may be referred to as a symbol-sum. When X is expressed on the basis not of a codeword, but of a stream, AX may be referred to as a mixed-stream. That is, there is a difference only in the unit that expresses bits, and the 'summed codeword', 'symbol-sum', and 'mixed-stream' may mean AX in Equation 4.

Calculation by the linear combining unit 310 generates summed codewords on the basis of an integer matrix, unlike that signals for antennas are discriminated on the basis of an effective identity matrix (or a diagonal matrix) in a linear receiver algorithm such as ZF and MMSE. In other words, the linear combining unit 310 can output other codewords that are generated by combining codewords transmitted from the transmitting apparatus 110. For example, depending on the elements of an integer matrix, the summed codeword of a first receiving antenna may be not only a first codeword of a first transmitting antenna, but a codeword obtained by mixing a third codeword of a third transmitting antenna and a fourth codeword of a fourth transmitting antenna. Since the elements of an integer matrix are integers, a summed codeword may also be an effective codeword in accordance with modulo operation.

$$u_m = \sum_l a_{m,l} w_l \qquad \text{Equation 5}$$

where $u_m$ is a summed codeword corresponding to an m-th receiving antenna. $\iota$ is an index of transmitting antennas and $a_{m,l}$ is the element in m-th row and $\iota$-th column in an integer matrix. $w_\iota$ is a codeword corresponding to the t-th transmitting antenna.

The linear combining unit 310 can output signals including sums of summed codewords and effective noise. The process of outputting summed codewords is referred to as sum-detection.

The decoders 320-1 to 320-K can decode codewords output from the linear combining unit 310. K may correspond to the number of receiving antennas. A codeword is a unit that can be independently decoded and at least one codeword may be included in a stream. For example, when a stream includes a 16 Quadrature Amplitude Modulation (QAM) symbol, codeword decoding can be performed a maximum of 4 ($=\log_2 16$) times on each stream for symbols corresponding to codeword lengths. Alternatively, when a stream includes a Binary Phase Shift Keying (BPSK) symbol, codeword decoding can be performed a maximum of 1($=\log_2 2$) time on each stream for symbols corresponding to codeword lengths.

The decoders 320-1 to 320-K can output interference-free summed codewords by decoding summed codewords corresponding to receiving antennas. The decoders 320-1 to 320-K can operate Single Input Single Output (SISO) decoders. In other words, the decoders 320-1 to 320-K can perform decoding regardless of interference by other antennas. The decoding type that does not separately decode codewords, but considers a linear combination obtained by summing codewords is referred to as sum-decoding.

Figure 3B:
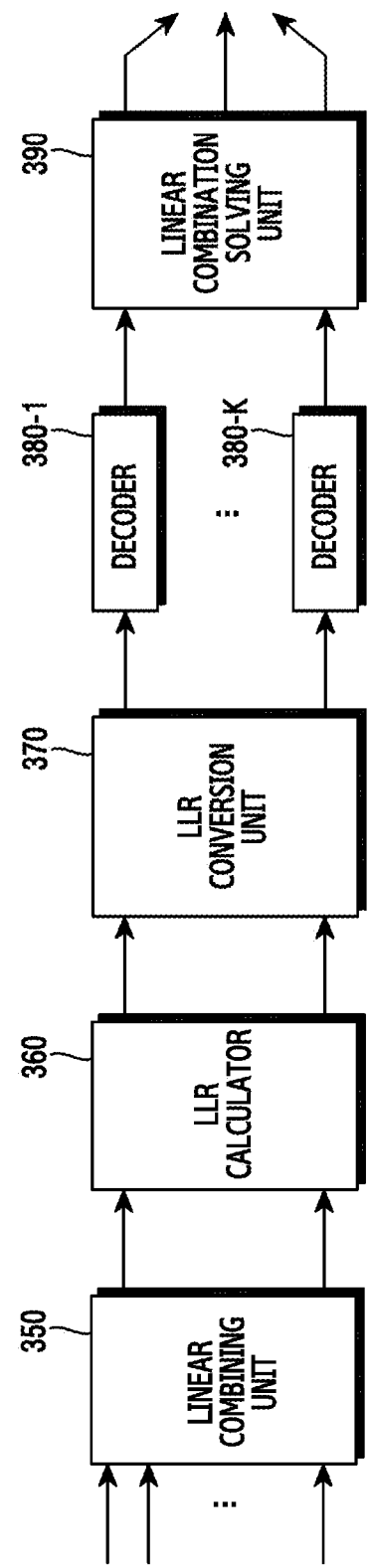
FIG. 3B shows the functional configuration of a control unit for IF detection in a wireless communication system according to various embodiments.

The linear combination solving unit 330 performs reverse conversion corresponding to the combination performed by the linear combining unit 310. That is, the linear combination solving unit 330 solves a combination of bits obtained by the linear combining unit 310. Accordingly, pre-encoding bits of the codewords generated by the transmitting apparatus 110 can be estimated. That is, the linear combination solving unit 330 outputs estimated bits of the pre-encoding bits of the codewords generated by the transmitting apparatus 110. For example, the linear combination solving unit 330 can determine original information words transmitted from the transmitting apparatus 110 on the basis of the following equation.

$$W = A^{-1} U \qquad \text{Equation 6}$$

where W is a vector showing an information word and A is the integer matrix of Equation 4. U is a vector showing information word-sums output from the decoders 320-1 to 320-K. FIG. 3B shows the functional configuration of the communication unit 210 for IF detection in a wireless communication system according to various embodiments.

Referring to FIG. 3B, the communication unit 210 may include a linear combining unit 350, a Log Likelihood Ratio (LLR) calculator 360, an LLR transformer 370, decoders 380-1 to 380-K, and a linear combination solving unit 390. The linear combining unit 350 may be referred to as a 'linear equalizer' and the linear combination solving unit 390 may be referred to as a 'linear equation solving unit'.

The linear combining unit 350 can multiply signals received through wireless channels of a plurality of antennas by an equalization matrix. Signals including sums of summed codewords and effective noise can be output in accordance with calculation by the linear combining unit 350. In detail, it is possible to output signals including sums of symbol-sums and effective noise at each of n time units. The time unit may be a time unit at which one symbol is received through one antenna. The symbol-sums may be a bit corresponding to one time unit of the summed codewords. The process of outputting symbol-sums is referred to sum-detection, similar to the summed codewords.

The linear combining unit 350, unlike the linear combining unit 310 shown in FIG. 3A, can obtain an integer matrix at each time unit. That is, the IF decoding solution described with reference to FIG. 3A uses one integer-valued effective channel matrix, but the IF detection solution can use a plurality of integer matrixes. For example, when the channel matrix of a t-th received signal is $H_t$, the linear combining unit 350 can multiply the t-th received signal by an equalization matrix $B_t$ of $H_t$ (t=1, 2, ..., n). Accordingly, the linear combining unit 350 can obtain integer matrixes $A_1$, $A_2$, ..., $A_n$ at time units, respectively. In other words, the linear combining unit 350 can adaptively change integer matrixes as time passes.

The LLR calculator 360 can calculate LLR values, using the integer matrixes. That is, when $A_t$ is determined by the linear combining unit 350, the LLR calculator 360 can calculate LLR values of symbol-sums for respective receiving antennas from a signal received for a time unit t, using $A_t$. Unlike the IF decoding shown in FIG. 3A, the receiving apparatus 120 performing the IF detection determines a new integer matrix at each time unit in consideration of influence by channels that are changed as time passes.

As in the IF decoding, the inverse matrix of A can be used in the IF detection to solve a linear combination. Decoding is performed in units of a codeword, so the LLR values of the symbols combined by the integer matrixes $A_1, A_2, \ldots, A_n$ can be recombined on the basis of one new common integer matrix. The LLR transformer 370 can transform the LLR values to correspond to a new integer matrix. The new integer matrix is referred to as a transformation integer matrix herein. The transformation integer matrix can be denoted by $\overline{A}$. The LLR transformer 370 can transform LLR values of a symbol-sum corresponding to $A_t$ into LLR values of a symbol-sum by the transformation integer matrix $\overline{A}$. In some embodiments, the transformation integer matrix $\overline{A}$ may be defined in advance. For example, the transformation integer matrix $\overline{A}$ may be defined as an identity matrix.

The decoders 380-1 to 380-K can decode codewords, using LLR values output from the LLR transformer 370. K may correspond to the number of receiving antennas. The decoders 380-1 to 380-K can operate like SISO decoders. The decoders 380-1 to 380-K can perform a soft decision on the transformed LLR values and then determine bit values of symbol-sums. In other words, the operation of the IF decoding algorithm described above can be applied to the transformed LLR values. In some embodiments, when the transformation integer matrix $\overline{A}$ is defined in advance, the decoders 380-1 to 380-K can perform a soft decision on the transformed LLR values and then determine not a symbol-sum for each transmitting antenna, but a symbol for each transmitting antenna. The decoders 380-1 to 380-K can output the value of the symbol for each antenna. In detail, in an MLC environment, the decoders 380-1 to 380-K can recursively and repeatedly output the bit of each transmitting antenna from the least significant bit (LSB) to the most significant bit (MSB). The output bits constitute the symbol. By using the transformation integer matrix $\overline{A}$, the receiving apparatus 120 can solve symbol-sums for a different integer matrix at each time unit.

The linear combination solving unit 390 can perform inverse transformation corresponding to a combination by the transformation integer matrix $\overline{A}$ on the decoding results output from the decoders 380-1 to 380-K. The linear combination solving unit 390 can restore information words transmitted at the time unit t from the transmitting apparatus 110 by multiplying symbol-sums by the inverse matrix of the transformation integer matrix $\overline{A}$. Meanwhile, as described above, in some embodiments, when the transformation integer matrix is an identity matrix $\overline{A}$, decoding can be performed regardless of linear combination of codewords (or symbols). Accordingly, the linear combination solving unit 390 can be removed from the receiving apparatus 120. The decoding type not considering linear combination may be referred to as individual codeword decoding.

Figure 4:
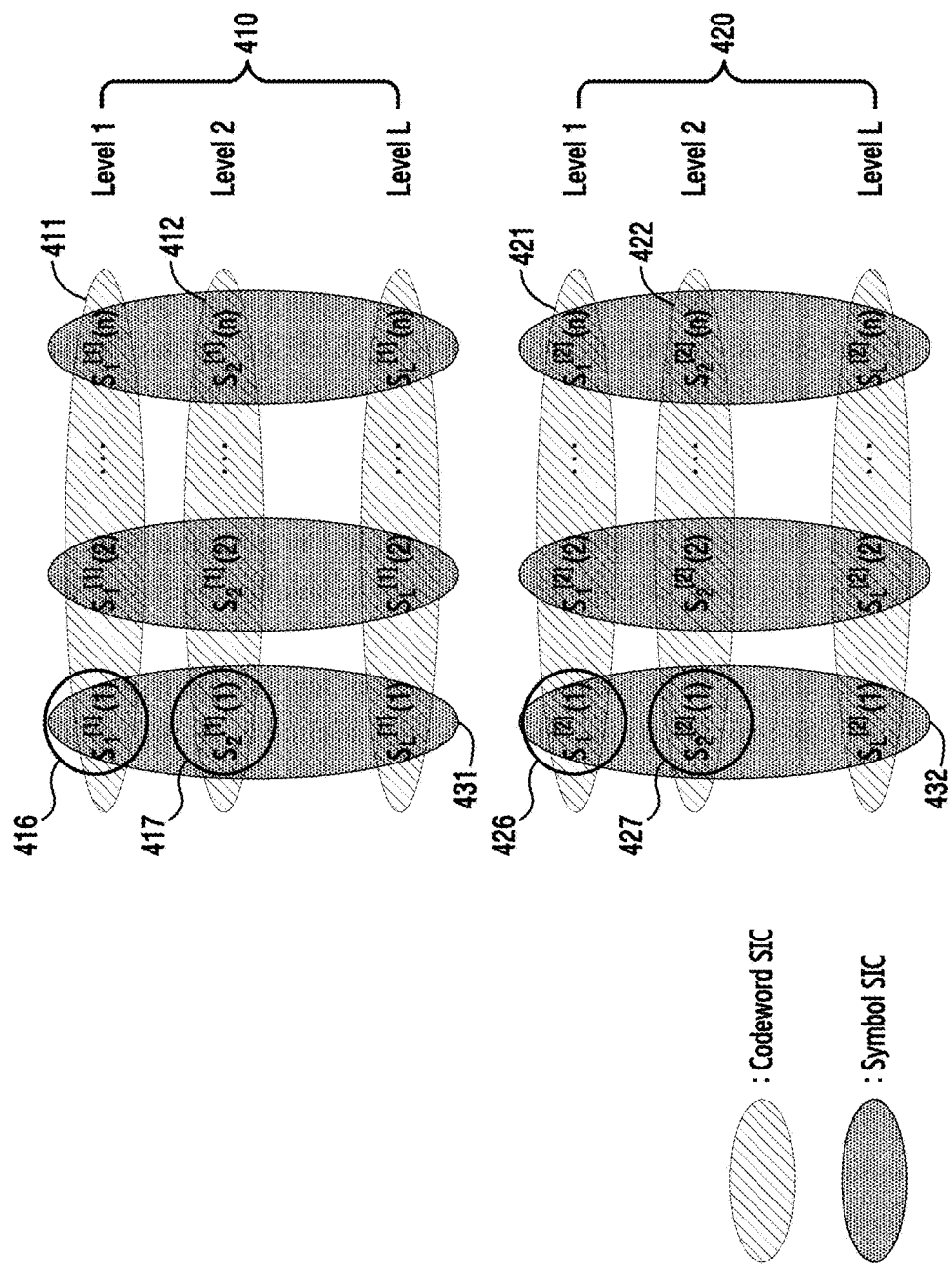
FIG. 4 shows the concept of Successive Interference Cancellation (SIC) that is performed in a wireless communication system according to various embodiments.

Hereafter, various SIC techniques to be performed in combination with the IF technique and terms for performing the SIC solution in accordance with various embodiments are defined with reference to FIG. 4.

FIG. 4 shows the concept of SICs that are performed in a wireless communication system according to various embodiments. It is assumed that the transmitting apparatus 110 shown in FIG. 1 transmits bits 400 to the receiving apparatus 120.

The transmitting apparatus 110 can transmit a first stream 410 through a first transmitting antenna. The transmitting apparatus 110 can transmit the first stream 410 for n time units. The transmitting apparatus 110 can transmit $S^{[1]}(1)$ (for example, a first symbol 431) through the first transmitting antenna for the first time unit. Similarly, the transmitting apparatus 110 can transmit $S^{[1]}(n)$ through the first transmitting antenna for the n-th time unit. The symbol may include at least one bit, depending on the modulation type. For example, when the symbol is modulated into 4QAM, the symbol may include two bits. Alternatively, when the symbol is modulated into 64QAM, the symbol may include six bits. This can be expressed as the following Equation 7.

$$s^{[1]}(t) = \sum_{i=1}^{L} 2^{i-1} s_i^{[1]}(t) \qquad \text{Equation 7}$$

where $s^{[1]}(t)$ is a symbol that is transmitted at the t-th time unit through the first transmitting antenna. L is the number of bits in the symbol. $s_i^{[1]}(t)$ is the value of the i-th bit in the symbol that is transmitted at the t-th time unit through the first transmitting antenna. The i-th bit may be referred to as a level 'I'.

The transmitting apparatus 110 can transmit a second stream 420 through a second transmitting antenna. The transmitting apparatus 110 can transmit $S^{[2]}(1)$ (for example, a second symbol 432) through the second antenna at the first time unit. Similarly, the transmitting apparatus 110 can transmit $S^{[2]}(n)$ through the second transmitting antenna at the n-th time unit. For example, when the transmitting apparatus 110 transmits a 16 QAM symbol showing 11(=0b1011) at a second time unit through the first transmitting antenna, the symbol can be expressed as the following Equation 8.

$$s^{[1]}(2) = \sum_{i=1}^{4} 2^{i-1} s_i^{[1]}(2) = 2^3 \times 1 + 2^2 \times 0 + 2^1 \times 1 + 2^0 \times 1 \qquad \text{Equation 8}$$

In some embodiments, the transmitting apparatus 110 can transmit signals to the receiving apparatus 120, using natural mapping. Natural mapping is a mapping type that increases the digits shown by bits by one each time in accordance with the order of constellation points. In some other embodiments, the transmitting apparatus 110 can transmit signals to the receiving apparatus 120, using gray mapping. Gray mapping is a mapping method that minimizes the number of different bits between bit strings mapped on two adjacent constellation points.

Bits that are actually transmitted include an in-phase channel) (I channel) component corresponding to the vertical axis and a quadrature channel (Q channel) component corresponding to the horizontal axis in a complex coordinate system, as in the following Equation 9.

$$s_i^m(t) = \alpha \times a_i^m(t) + \beta \times b_i^m(t) \qquad \text{Equation 9}$$

where $s_i^m(t)$ is an i-th bit that is transmitted from an m-th transmitting antenna at a t-th time unit. $a_i^m(t)$ is an i-th bit that is transmitted to the I channel from the m-th transmitting antenna at the t-th time unit and $b_i^m(t)$ is an i-th bit that is transmitted to the Q channel from the m-th transmitting antenna at the t-th time unit. $\alpha$ and $\beta$ are constants of an I channel component and a Q channel component that are determined by a modulation order.

The transmitting apparatus 110 can transmit the first stream 410 including at least one codeword for n time units. The codeword may be the unit of words that are generated by encoding. That is, the codeword may be the unit of decoding. The first stream 410 including n symbols may include L codewords. The bit number of the symbols included in the first stream 410 may be L.

In some embodiments, the transmitting apparatus 110 can transmit signals to the receiving apparatus 120, using Multi-Level Coding (MLC), as shown in FIG. 4. MLC is a method of performing channel coding on each of bit levels constituting a modulation symbol. Though not shown in FIG. 4, in some other embodiments, the transmitting apparatus 110 may transmit signals to the receiving apparatus 120, using BICM. BICM is a method that, when the number of bits for generating one modulation symbol is M, interleaves output from a channel encoder in units of a bit and then maps M bits to one modulation symbol.

Although the above description is based on the transmitting apparatus 110 that transmits the bits 400 for the convenience of description, the receiving apparatus 120 can receive the bits 400. It is assumed in the following description that the receiving apparatus 120 receives the first stream 410 transmitted through the first transmitting antenna and receives the second stream 420 transmitted through the second transmitting antenna.

The receiving apparatus 120 can use various SIC techniques in the present disclosure. Various SIC techniques may be classified into codeword SIC that performs decoding and then removes the decoding result from an original signal and symbol SIC that removes a symbol detected from a signal in a detection process before decoding.

The codeword SIC may include a codeword level SIC and an inter-stream codeword SIC. The codeword level SIC is a solution that sequentially removes codewords between levels (or bit digit numbers). For example, the receiving apparatus 120 can decode first codewords (for example, a first codeword 411 and a first codeword 421) corresponding to a level '1' of a plurality of streams. In other words, the first codewords may correspond respectively to a plurality of transmitting antennas that has received signals. The receiving apparatus 120 can remove the first codewords that have been decoded from the streams. The receiving apparatus 120 can decode second codewords (for example, a second codeword 412 and a second codeword 422) corresponding to a level '2' of the streams. In the same way, the receiving apparatus 120 can decode up to codewords corresponding to a level 'L' and then finish decoding. The operation that removes decoded codewords is referred to as codeword level SIC.

Inter-stream codeword SIC is a solution that sequentially removes codewords between streams corresponding to different transmitting antennas. The term 'inter-stream' means that an SIC is separately performed on transmitting antennas. For example, when decoding first codewords corresponding to a level '1' of a plurality of streams, the receiving apparatus 120 may fail to decode some (for example, a first codeword 421) of the first codewords. In this case, the receiving apparatus 120 may remove a first codeword (for example, a first codeword 411), which has been successfully decoded, of the streams. The receiving apparatus 120 can decode the first codewords that have failed in decoding in the previous process, after removing the successfully decoded first codeword. Thereafter, it is possible to repeat inter-stream removal until decoding is succeeded. When successfully decoding all first codewords, the receiving apparatus 120 can perform decoding on all levels in the same manner described in relation to the codeword level SIC. Inter-stream removing is referred to as an inter-stream codeword SIC.

Although codeword level SIC and inter-stream codeword SIC were described above, SIC may be both of 'codeword level SIC' and 'inter-stream codeword SIC'. For example, SIC that is performed in the IF reception solution shown in FIG. 10 may be both of 'codeword level SIC' and 'inter-stream codeword SIC'.

Symbol SIC may include symbol level SIC and inter-stream symbol SIC. The symbol level SIC is a solution that sequentially removes bits between levels (or bit digit numbers). For example, the receiving apparatus 120 can detect a plurality of symbols received at the t-th time unit of a plurality of streams. The symbols may respectively correspond to a plurality of transmitting antennas through which signals have been transmitted. The receiving apparatus 120 can detect level-1 bits (for example, a level-1 bit 416 and a level-1 bit 426) corresponding to a level '1' of the symbols. The receiving apparatus 120 can remove the detected level-1 bits of the symbols. The receiving apparatus 120 can detect level-2 bits (for example, a level-2 bit 417 and a level-2 bit 427) corresponding to a level '2' of the symbols. In the same way, the receiving apparatus 120 can detect up to symbols corresponding to a level 'L' and then finish detecting. The operation of removing the detected bits of the previous level of the symbols to detect the bits of the next level is referred to as symbol level SIC. Symbol level SIC may also be referred to as a bit SIC.

The inter-stream symbol SIC is a solution that sequentially removes symbols (or bits) between streams corresponding to other antennas, respectively. For example, the receiving apparatus 120 can detect first a first symbol 431 (or a level-1 bit 416) corresponding to a first antenna of the symbols. The receiving apparatus 120 can remove the detected first symbol 431 (or level-1 bit 416) of the symbols to detect a symbol (or a level-1 bit 426) corresponding to another antenna. The receiving apparatus 120 can detect a symbol (for example, a second symbol 432) (or a level-1 bit 426) corresponding to another antenna after removing the detected first symbol 431 (or the level-1 bit 416). Thereafter, it is possible to repeatedly remove symbols (or bits) between streams until detecting all symbols. When all of the symbols are successfully detected, the detection can be finished. The operation of removing symbols between streams is referred to as inter-stream symbol SIC. When bit digits are encoded, an operation of removing bits corresponding to specific streams may be performed, depending on the coded modulation type (for example, MLC). The operation of removing bits may be referred to as an inter-stream bit SIC.

Although symbol level SIC and inter-stream symbol SIC were described above, SIC may be both of 'symbol level SIC' and 'inter-stream symbol SIC'. For example, SIC that is performed in the IF reception solution shown in FIG. 6 may be both of 'inter-stream symbol SIC that removes fixed symbols' and 'symbol level SIC' that is performed in units of a bit.

The general operation of the receiving apparatus 120 using a combination of the IF reception solution and the SIC is described hereafter with reference to FIG. 5 on the basis of the definitions and terms described with reference to FIGS. 1 to 4. Further, IF reception techniques according to various embodiments are exemplified thereafter with reference to FIGS. 6 to 11.

Figure 5:
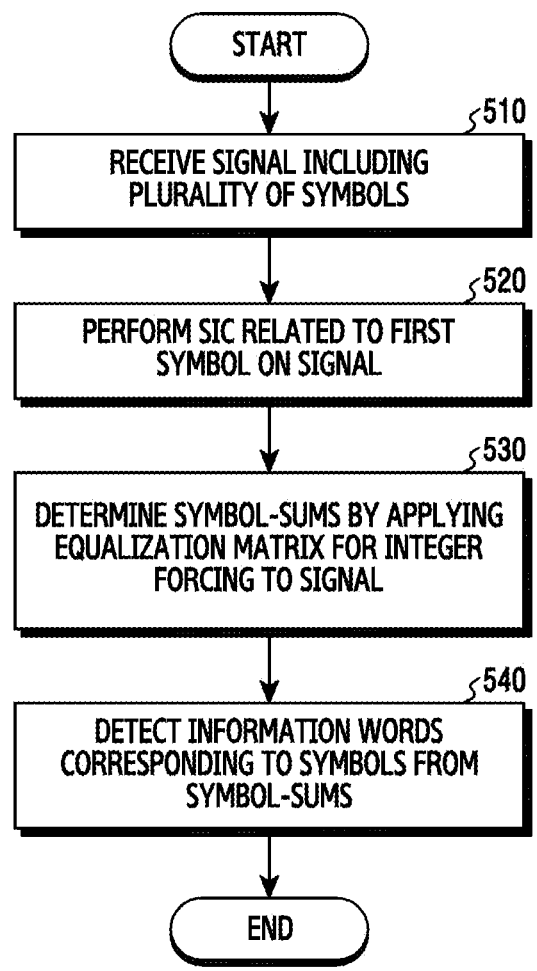
FIG. 5 shows the operation flow of a receiving apparatus in a wireless communication system according to various embodiments.

FIG. 5 shows the operation flow of the receiving apparatus 120 in a wireless communication system according to various embodiments.

Referring to FIG. 5, in step 510, the receiving apparatus 120 can receive a signal including a plurality of symbols. The symbols may respectively correspond to antennas of the transmitting apparatus 110. That is, a plurality of symbols may be symbols that are transmitted from different transmitting antennas. For example, when the transmitting apparatus 110 receives a plurality of symbols through four antennas, the symbols may include four symbols.

The receiving apparatus 120 can receive signals including additional symbols for a predetermined time. The predetermined time may be time corresponding to the length of a codeword. The receiving apparatus 120 can receive a plurality of streams including the symbols for the predetermined time. For the convenience of description, the symbol may show the unit of information that is transmitted from one antenna for one time unit and the stream may mean a set of symbols that are transmitted for a time unit corresponding to the length of a codeword. The streams each may be one codeword or composed of a plurality of codewords, depending on the coded modulation type of the transmitting apparatus 110. For example, when a 16 QAM symbol of the transmitting apparatus 110 is encoded by MLC, the streams may be each composed of four codewords.

In step 520, the receiving apparatus 120 can perform an SIC related to a first symbol on the received signal. The receiving apparatus 120 can determine a part, which is related to the first symbol, on which SIC is performed. The part related to the first symbol may be a first symbol, a stream including the first symbol, or a codeword corresponding to a specific level of the first symbol. The part related to the first symbol may be selected in accordance with the type of ML, the structure of an integer matrix, or whether decoding has succeeded.

SIC can be classified into codeword SIC that is performed after decoding and symbol SIC that is performed before decoding. The codeword SIC can be classified into inter-stream codeword SIC that removes parts corresponding to some of a plurality of streams and codeword level SIC that removes codewords at a specific level of all of a plurality of streams. The symbol SIC can be classified into inter-stream symbol SIC that removes parts corresponding to some of a plurality of symbols and symbol level SIC that removes bits at a specific level of all of a plurality of symbols. The inter-stream symbol SIC may be implemented in an inter-stream bit SIC, depending on a specific coded modulation type (for example, MLC). The symbol level SIC may also be referred to as a bit SIC.

In step 530, the receiving apparatus 120 can determine symbol-sums by applying an equalization matrix for integer forcing to the signal. The signal is a signal in which the SIC is performed. The signal is referred as 'a processed signal', 'a partial signal', 'a interim signal'. In some embodiment, as the SIC is performed, the processed signal includes symbols of the signal except at least one symbol or bits of the signal except at least one bit. Hereinafter, for convenience of explanation, the signal on which the SIC is performed is referred to as the processed signal. The receiving apparatus 120 can determine symbol-sums by multiplying the processed signal by the equalization matrix for integer forcing. The receiving apparatus 120 can determine an equalization matrix to determine the symbol-sums. The receiving apparatus 120 can determine an integer matrix to determine the equalization matrix. An integer matrix may be determined from a channel matrix. In some embodiments, the receiving apparatus 120 can determine the integer matrix from a channel matrix corresponding to the processed signal in which the SIC is performed. In other embodiments, the receiving apparatus 120 may determine the integer matrix from an integer matrix before the SIC is performed.

The receiving apparatus 120 can determine symbol-sums from the determined integer matrix. The receiving apparatus 120 can receive signals mixed with a plurality of streams through each of receiving antennas, depending on correlativity of MIMO channels. The mixed signals mean symbol-sums per time unit. When symbol-sums at a specific level are accumulated for a predetermined time, the accumulated information may be referred to as a summed codeword. When summed codewords at all levels are accumulated for a predetermined time, the accumulated information may be referred to as a mixed stream. The receiving apparatus 120 can decrease the amplification of noise, unlike other linear reception techniques, by detecting symbol-sums without setting a specific filter.

In step 540, the receiving apparatus 120 can detect information words corresponding to the symbols from the determined symbol-sums. In some embodiments, after detecting the symbol-sums, the receiving apparatus 120 can obtain summed codewords (for example, mixed streams) by concatenating symbol-sums detected for a predetermined time. The receiving apparatus 120 can decode the summed codewords. This decoding is referred to as sum decoding. The decoding type may be SISO decoding. After the sum decoding, the receiving apparatus 120 can separate linearly summed information words obtained by decoding, that is, information word-sums into individual information words, using an inverse matrix of the integer matrix determined in step 510 or 520.

In some other embodiments, the receiving apparatus 120 can detect individual information words by dividing the symbol-sums into a plurality of symbols and then decoding the symbols. The receiving apparatus 120 can calculate an LLR value of the integer matrix determined in step 510 or 520 and then transform the LLR value in accordance with a transformation integer matrix. The transformation integer matrix may be set in advance as an identity matrix. The receiving apparatus 120 can detect a plurality of symbols from the symbol-sums on the basis of the transformation procedure. The receiving apparatus 120 can decode a plurality of detected symbols. The decoding can be performed by a SISO decoder.

FIG. 5 shows operations for describing the operation flow of the receiving apparatus 120. Reception techniques robust against channel change by realizing, repeating, or partially performing the operations of FIG. 5 are described hereafter with reference to FIGS. 6 to 11.

Maximum Likelihood Detection (MLD) & IF Detection

Figure 6:
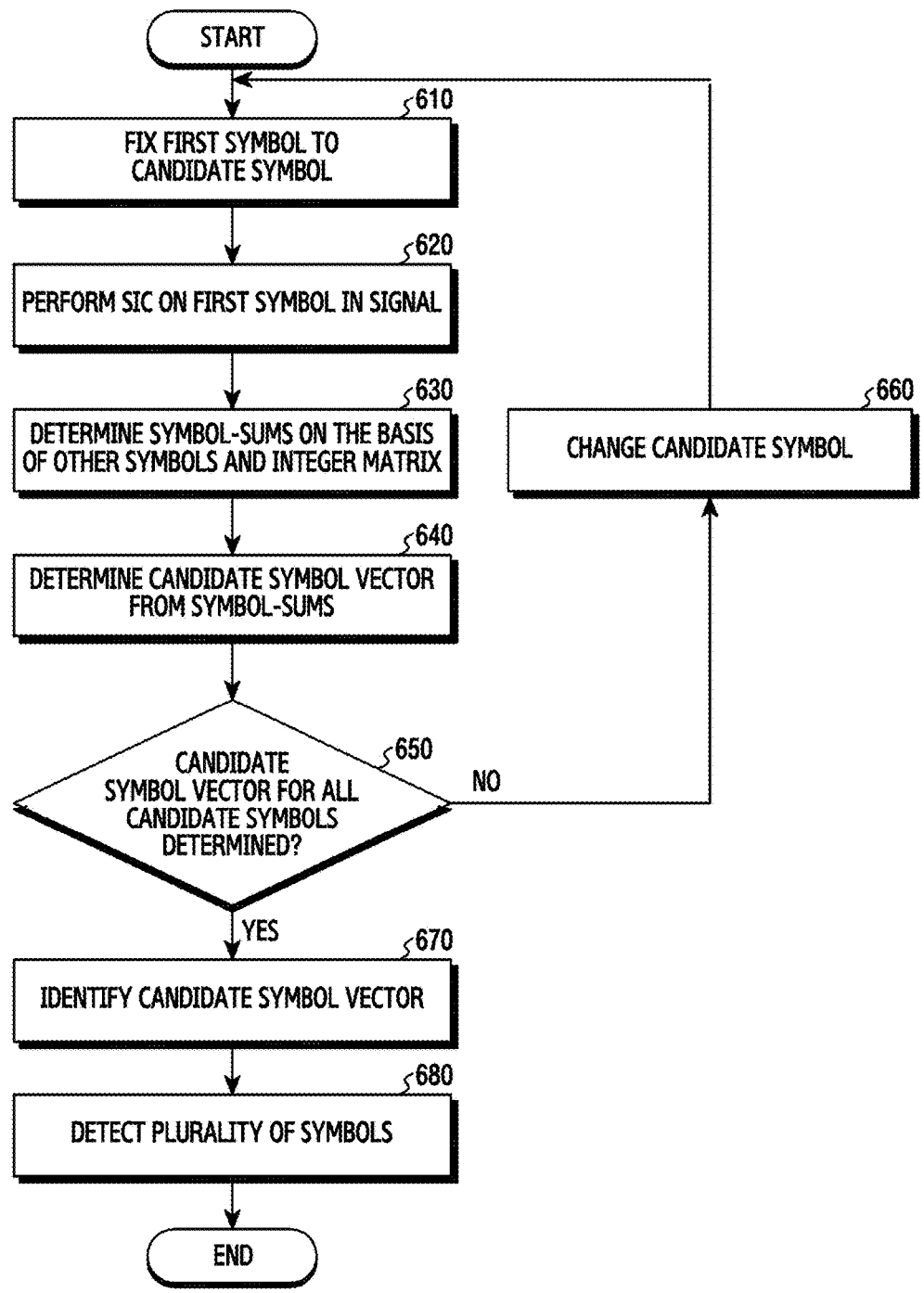
FIG. 6 shows the operation flow for performing a Maximum Likelihood (LF)-IF detection solution in a wireless communication system according to various embodiments.

FIG. 6 shows an operation flow for performing an ML-IF detection solution in a wireless communication system according to various embodiments. The receiving apparatus 120 shown in FIG. 1 can perform an ML-IF detection solution to detect streams. The ML-IF detection solution means a solution that detects some of symbols, using the MLD solution and detects the other symbols, using the IF detection solution.

Referring to FIG. 6, in step 610, the receiving apparatus 120 can fix a first symbol as a candidate symbol. The receiving apparatus 120 can determine a first symbol to fix of a plurality of symbols. In some embodiments, the receiving apparatus 120 can determine the symbol having the largest norm of vectors respectively corresponding to streams in a channel matrix of the received signal as the first symbol.

The receiving apparatus 120 can determine a plurality of candidate symbols in accordance with the modulation type of the first symbol. For example, when the modulation type of the first symbol is Quadrature Phase Shift Keying (QPSK), the receiving apparatus 120 can determine four candidate symbols. The receiving apparatus 120 can fix the first symbol by selecting one symbol from a plurality of candidate symbols.

In step 620, the receiving apparatus 120 can perform SIC on the first symbol of a received signal. The receiving apparatus 120 can perform SIC on the signal in accordance with the candidate symbol value of the fixed first symbol. The SIC may be an inter-stream symbol SIC (or an inter-stream bit SIC). In other words, the receiving apparatus 120 can remove the first symbol itself or some contribution from a received signal. By removing the fixed first symbol, the receiving apparatus 120 can change the magnitude of an existing channel matrix. For example, the receiving apparatus 120 can change a 4×4 channel matrix into a 4×3 or 3×3 channel matrix. This is because the number of input symbols was reduced by fixing the first symbol. The receiving apparatus 120 can determine the changed channel matrix. Step 620 may correspond to step 520 in FIG. 5.

In step 630, the receiving apparatus 120 can determine symbol-sums on the basis of the other symbols and an integer matrix. The receiving apparatus 120 can determine an input vector, using symbols other than the fixed symbols. The receiving apparatus 120 can determine an integer matrix on the basis of the newly determined (that is, down-sized) channel matrix. The receiving apparatus 120 can determine symbol-sums on the basis of the input vector and the determined integer matrix.

In step 640, the receiving apparatus 120 can determine a candidate symbol vector from the symbol-sums. The receiving apparatus 120 can determine a transformation integer matrix for symbol-sums in accordance with the IF detection solution shown in FIG. 3B. The receiving apparatus 120 can transform the symbol-sums using the transformation integer matrix such that influence by channel changes of the symbol-sums is reflected. In detail, the receiving apparatus 120 can change the LLR values of existing LLR values to correspond to the transformation integer matrix. The transformation integer matrix may be set in advance to be an identity matrix. By changing the LLR values on the basis of the identity matrix, the receiving apparatus 120 can obtain LLR values for the other symbols from the symbol-sums. The receiving apparatus 120 can determine values of the other symbols by performing a soft decision on the LLR values of the other symbols. In detail, the receiving apparatus 120 can determine the other symbol values through bit-unit calculation by performing a soft decision on the LLR value at each level of symbols. The receiving apparatus 120 can determine one candidate symbol vector by summing up the first symbol fixed in step 610 and the other symbols determined in step 640.

In step 650, the receiving apparatus 120 can determine whether it has determined symbol vectors for all candidate symbols. All candidate symbols mean all candidate symbols of the first symbol in step 610. That is, the receiving apparatus 120 can determine whether the number of determined candidate symbol vectors is the same as the number of candidate symbols. The receiving apparatus 120 can perform step 660, when it has not determined candidate symbol vectors for all candidate symbols. However, when the receiving apparatus 120 has determined candidate symbol vectors for all candidate symbols, it can perform step 670.

In step 660, the receiving apparatus 120 can change candidate symbols. In order to fix other candidate symbols in the subsequent step 610, the receiving apparatus 120 can determine candidate symbols different from the candidate symbols fixed in previous step 610.

In step 670, the receiving apparatus 120 can identify the candidate symbol vector having the smallest Euclidean distance. The receiving apparatus 120 can calculate differences between a plurality of candidate symbol vectors (all candidate symbol vectors) and the actually received signal. The difference may be Euclidean distances. The receiving apparatus 120 can identify the candidate symbol vector having the smallest difference, that is, Euclidean distance. The smallest Euclidean distance means that the possibility that the candidate symbol vector corresponds to symbols included in the signal is the largest.

In step 680, the receiving apparatus 120 can detect a plurality of symbols. The receiving apparatus 120 can determine the elements included in the identified candidate symbol vector as the symbols, respectively. For example, when the identified candidate symbol vector is [3 0 1 1], the receiving apparatus 120 can determine that symbols for transmitting antennas included in the actually received signal are respectively 3, 0, 1, and 1.

Though not shown in FIG. 6, the receiving apparatus 120 can perform additional operations to maximize a capability gain. The receiving apparatus 120 can determine the element corresponding to the fixed first symbol of the identified candidate symbol vectors as a symbol, in step 680. For example, when the identified candidate symbol vector is [3 0 1 1] and the first symbol is fixed, the receiving apparatus 120 detects that the first symbol is 3 and does not perform detection on the other symbols. Thereafter, the receiving apparatus 120 can repeat steps 610 to 670 for the other symbols. One process from steps 610 to 670 may be referred as one operation cycle. The receiving apparatus 120 can fix one of the other symbols instead of the first symbol removed in the previous operation cycle, in step 610. When the second operation cycle is finished, the receiving apparatus 120 can fix another symbol other than the symbols fixed during the second operation cycle and repeat again steps 610 to 670. As the number of times of the operation cycles is increased, the detection capability of the receiving apparatus 120 can be increased. However, as the number of times of the operation cycles is increased, complexity of the receiving apparatus 120 may also be increased. Accordingly, in some embodiments, the receiving apparatus 120 can adaptively determine whether to repeat steps 610 to 670 or end detection in step 680, depending on the requested complexity and capability or the current channel state.

The receiving apparatus 120 can reduce complexity in comparison to the existing ML solution by using the ML detection solution for some of a plurality of symbols and can have capability close to that of ML by combining an IF detection solution that is robust against channel changes.

Figure 7:
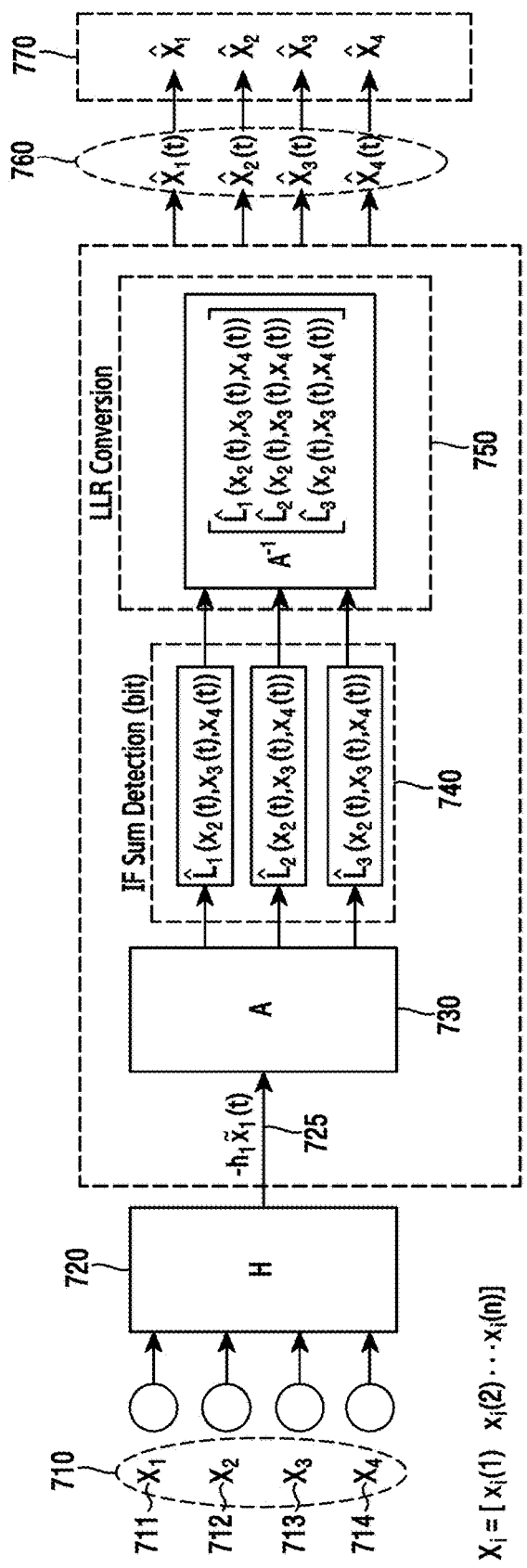
FIG. 7 shows an example of an ML-IF detection solution according to various embodiments.

FIG. 7 shows an example of an ML-IF detection solution according to various embodiments. For the convenience of description, an operation of receiving a 16 QAM symbol in a 4×4 MIMO environment in accordance with the ML-IF detection solution is exemplified.

Referring to FIG. 7, the transmitting apparatus 110 can transmit a signal including a plurality of streams 710 ($x_1$, $x_2$, $x_3$, and $x_4$) for n time units. The number of streams may correspond to the number of transmitting antennas of the transmitting apparatus 110. The receiving apparatus 120 can receive a signal including noise with the above-mentioned signal through a channel for the n time units (720). The streams 710 may include a first stream 711($x_1$), a second stream 712($x_2$), a third stream 713($x_3$), and a fourth stream 714($x_4$). The four streams 710 can be expressed as a 4×1 stream vector X=[$x_1$ $x_2$ $x_3$ $x_4$]. One symbol $x_i(t)$ is a symbol that is transmitted at a t-th time unit of a stream that is transmitted through an i-th transmitting antenna. When the symbol is a 16 QAM symbol, it may be composed of four bits.

In order to describe the ML-IF detection solution, the operation of the receiving apparatus 120 is described on the basis of the time unit t. At the time unit t, the symbol included in the first stream 711 is referred to as a first symbol $x_1(t)$, the symbol included in the second stream 712 is referred to as a second symbol $x_2(t)$, the symbol included in the third stream 713 is referred to as a third symbol $x_3(t)$, and the symbol included in the fourth stream 714 is referred to as a fourth symbol $x_4(t)$. The symbols can be expressed as a symbol vector X(t)=[($x_1(t)$) ($x_2(t)$) ($x_3(t)$) ($x_4(t)$)].

The receiving apparatus 120 can receive a first signal including a plurality of symbols (for example, a first symbol, a second symbol, a third symbol, and a fourth symbol) at the time unit t. The receiving apparatus 120 can fix the value of one of the symbols. For example, since the symbols are 16 QAM symbols, the receiving apparatus 120 can fix the value of the first symbol to any one (for example, an eleventh symbol value) of sixteen values. Since the first symbol, which is a 16 QAM symbol, is expressed as four bits, the receiving apparatus 120 can fix the first symbol to a constellation value corresponding to '1011'. The receiving apparatus 120 can determine the bits of the first symbol as 1 at a level 1, 1 at a level 2, 0 at a level 3, and 1 at a level 4. In the first symbol, a level-1 bit, a level-2 bit, a level-3 bit, and a level-4 bit can be expressed as 1, 1, 0, and 1, respectively.

Meanwhile, for the convenience of description, the description is based on symbols, but calculation may be performed in units of a bit, depending on the coded modulation type. For example, when four symbols are encoded through MLC in the transmitting apparatus 110, the four symbols can be sequentially detected in accordance with the levels. The levels mean the digit numbers of bits. In detail, the receiving apparatus 120 can detect level-1 bits and then remove the level-1 bits from the original signal, detect level-2 bits and then remove the level-2 bits from the signal with the level-1 bits removed, detect level-3 bits and remove the level-3 bits from the signal with the level-2 bits removed, and detect level-4 bits. That is, the receiving apparatus 120 can perform symbol level SIC (or bit SIC). Though not shown in FIG. 7, the receiving apparatus 120 can recursively detect symbol-sums of the level 1 to the level 4.

The receiving apparatus 120 can perform IF detection shown in FIG. 3B on symbols other than the fixed symbol. In detail, the receiving apparatus 120 can remove interference by the fixed symbol from a first signal (725). For the convenience of description, the signal with interference by a fixed symbol from the signal is hereafter referred to as a second signal. The removing operation 725 can be performed in accordance with an inter-stream symbol SIC. When symbols are detected in units of a level, the removing operation 725 may be referred to as inter-stream bit SIC.

The receiving apparatus 120 can determine a channel matrix for the second signal by removing the term corresponding to the fixed symbol from the channel matrix of the first signal. The receiving apparatus 120 can determine an integer matrix for the other symbols from Equation 4 on the basis of the second signal and the channel matrix for the second signal (730). For example, the other symbols may be a second symbol $x_2(t)$, a third symbol $x_3(t)$, and a fourth symbol $x_4(t)$, and the size of the integer matrix may be 3×3.

The receiving apparatus 120 can calculate symbol-sums, using the integer matrix. The symbol-sums are linearly summed values of bits at a specific level of symbols (or corresponding symbols). For example, the receiving apparatus 120 can calculate $L_1\{x_2(t), x_3(t), x_4(t)\}$, $L_2\{x_2(t), x_3(t), x_4(t)\}$ and $L_3\{x_2(t), x_3(t), x_4(t)\}$ that are symbol-sums corresponding to second to fourth symbols (740).

The receiving apparatus 120 can calculate LLR values, using the integer matrix. The receiving apparatus 120 can calculate LLR values for symbol-sums corresponding to the other streams. For example, the receiving apparatus 120 can calculate LLR values for symbol-sums corresponding to the second to fourth streams. The receiving apparatus 120 can transform the LLR value through the transformation integer matrix $\overline{A}$ (750). The transformation integer matrix $\overline{A}$ may be a predetermined identity matrix, as in FIG. 3B. The receiving apparatus 120 can determine candidate values of the second symbol $(x_2(t))$, the third symbol $(x_3(t))$, and the fourth symbol $(x_4(t))$ through the transformation from the symbol-sums. The receiving apparatus 120 can perform soft decision from a low level (for example, a level 1) to a high level (for example, a level 4) and then perform symbol level SIC. The receiving apparatus 120 can sequentially determine bit candidate values corresponding to the level 1 to level 4 of the other symbols.

The receiving apparatus 120 can determine candidates of a symbol vector x(t) by determining values of the second symbol $x_2(t)$, the third symbol $x_3(t)$, and the fourth symbol $x_4(t)$ other than the first symbol $x_1(t)$ fixed to one symbol value. The receiving apparatus 120 can change the fixed value of the first symbol and repeat the above operations. The receiving apparatus 120 can fix the symbol value to be fixed for the first symbol to one of sixteen values in accordance with the constellation of the 16 QAM, so it can obtain a total of sixteen candidate symbol vectors.

The receiving apparatus 120 can identify a vector of which the difference from the actually received first signal is the smallest of the sixteen candidate symbol vectors. The first signal includes inter-symbol interference and noise due to the channels of antennas, so it has a difference from a plurality of symbols in the transmitting apparatus 110. In detail, the receiving apparatus 120 can calculate Euclidean distances from the first signal for the sixteen candidate symbol vectors. The receiving apparatus 120 can identify the candidate symbol vector corresponding to the smallest Euclidean distance of the sixteen Euclidean distances. The receiving apparatus 120 can determine symbol values corresponding to the identified candidate symbol vector as symbol values of the symbol vector X(t). In other words, the receiving apparatus 120 can detect the symbol vector X(t) (760).

The receiving apparatus 120 can detect a plurality of symbol vectors by performing the above operations for a predetermined time (for example, n time units). The symbol vectors may mean stream vectors. The predetermined time may be time for which one codeword is obtained. The receiving apparatus 120 can decode the detected symbol vectors. When an integer matrix for transformation is an identity matrix, the receiving apparatus 120 can individually decode the detected symbol vectors. The receiving apparatus 120 can perform SISO decoding on the detected symbol vectors for each stream (770).

The receiving apparatus 120 may additionally perform the following operations to obtain a higher gain. The receiving apparatus 120 can determine the first symbol $(x_1(t))$ that is a fixed symbol of the detected symbol vector X(t). The receiving apparatus 120 can repeat the above operations on the second symbol $x_2(t)$, the third symbol $x_3(t)$, and the fourth symbol $x_4(t)$, which are the other symbols except for the first symbol $x_1(t)$. In detail, the receiving apparatus 120 can fix the value of a symbol (for example, the second symbol $x_2(t)$) corresponding to another transmitting antenna except for the first transmitting antenna of four transmitting antennas. Since the first symbol is removed, so the size of the channel matrix can be 4×3. When the channel matrix, which is an effective complex channel, is expressed in real numbers, it has a size of 8×6 (an effective real channel). The receiving apparatus 120 can determine a total of sixteen second candidate symbol vectors by changing the fixed value of the second symbol. The receiving apparatus 120 can identify the candidate symbol vector having the minimum Euclidean distance of the second candidate symbol vectors and can determine the symbol value corresponding to the second row in the identified candidate symbol vector as the value of the second symbol.

In some embodiments, the receiving apparatus 120 can adaptively determine whether to additionally perform ML+IF detection or to determine a candidate symbol vector detected to minimize a Euclidean distance as the final symbol vector, depending on required complexity and capability. For example, when high capability is used regardless of complexity, the receiving apparatus 120 can perform ML+IF detection on all streams. Alternatively, when the receiving apparatus 120 is sensitive to complexity, the receiving apparatus 120 can perform ML+IF detection on one stream and detect a candidate symbol vector, which is determined by fixing one symbol, as the final symbol vector. It should be noted that complexity and capability are in a trade-off relationship in this solution.

In accordance with the ML-IF detection solution, the receiving apparatus 120 can have lower complexity than ML, which is a nonlinear solution, and achieve a capability gain similar to ML. Since the receiving apparatus 120 combines the ML detection solution with the IF detection solution, it can achieve a gain that is increased as the correlation of a channel is increased. The capability gain, which is an index related to an error rate, can be measured, for example, as at least one of an Error Vector Magnitude (EVM), a Bit Error Rate (BER), and a Block Error Rate (BLER).

IF Decoding & SIC

Figure 8:
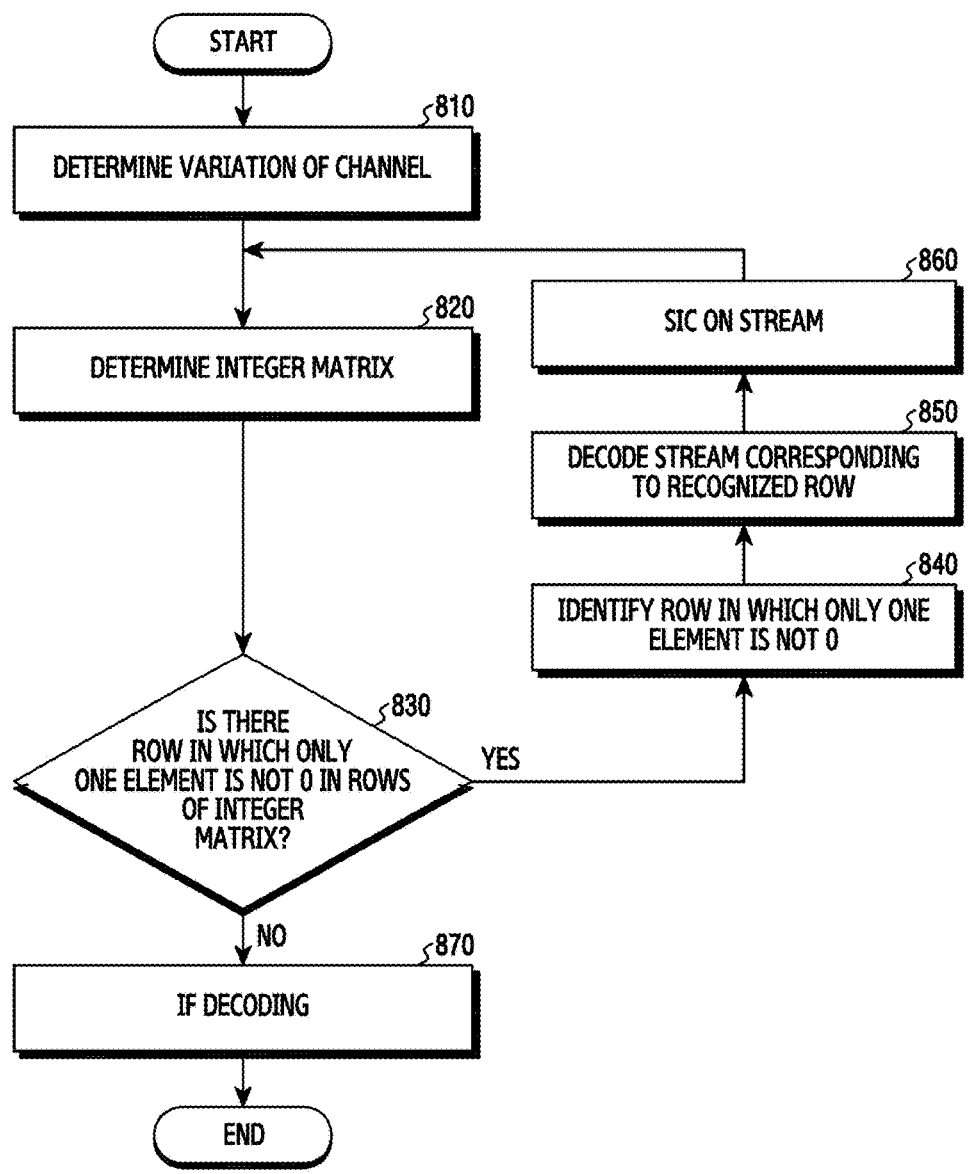
FIG. 8 shows an operation flow for performing an SIC-IF decoding solution in a wireless communication system according to various embodiments.

FIG. 8 shows an operation flow for performing an SIC-IF decoding solution in a wireless communication system according to various embodiments. The receiving apparatus 120 shown in FIG. 1 can perform the SIC-IF decoding solution to detect streams. The SIC-IF detection solution means a solution that removes some of streams by individually decoding them and then decodes the other streams using the IF decoding solution.

Referring to FIG. 8, in step 810, the receiving apparatus 120 can determine a channel variation. In some embodiments, the receiving apparatus 120 can determine the channel variation in accordance with signaling received from the transmitting apparatus 110. In some other embodiments, the receiving apparatus 120 can determine the channel variation on a time axis or a frequency axis by estimating a channel matrix of a received signal. As a metric showing channel change, delay spray, Doppler spread, propagation delay, a signal to noise ratio (SNR), or frequency offset may be used.

The receiving apparatus 120 can identify the step of the degree of channel change on the basis of the channel variation. For example, when the channel variation is a critical value or more, the receiving apparatus 120 can determine that the degree of current channel change is high. When the channel variation is less than the critical value, the receiving apparatus 120 can determine that the degree of current channel change is low. The receiving apparatus 120 can adaptively use the SIC-IF decoding solution, depending on the degree of channel change.

In step 820, the receiving apparatus 120 can change an integer matrix. The receiving apparatus 120 can determine an integer matrix from the channel matrix of a received signal.

In some embodiments, the receiving apparatus 120 can determine an integer matrix from a static channel matrix. The static channel matrix means a channel matrix in which the degree of channel change according to time is less than a critical value. The integer matrix is referred to as an initial integer matrix. In other words, the initial integer matrix is an integer matrix that is determined by the common IF technique described with reference to FIG. 3A or 3B (for example, Equation 4) when the degree of channel change is low.

The receiving apparatus 120 can determine the integer matrix such that the effective noise term except for AX in Equation 4 is minimized. In other words, the receiving apparatus 120 can determine the initial integer matrix in the manner of determining an integer matrix through the IF-decoding solution or the IF-detection solution.

In some other embodiments, the receiving apparatus 120 can determine an integer matrix from a dynamic channel matrix. The dynamic channel matrix means a channel matrix in which the degree of channel change according to time is a critical value or more. The integer matrix is referred to as an average integer matrix. When the degree of channel change is large, the receiving apparatus 120 can determine an average integer matrix on the basis of the average value of a cost function matrix. The receiving apparatus 120 can determine the average value of the cost function matrix from the following Equation 10.

$$\text{Average } Q = \frac{1}{n}\sum_{t=1}^{n}(I + SNR \cdot H(t) \cdot H^{H}(t)) \qquad \text{Equation 10}$$

where Average Q is the average value of a cost function matrix. SNR is the quality of a received signal, t is time, and H(t) is a channel matrix at time t. In other words, the receiving apparatus 120 can determine an average value by calculating the average of Q for an accumulated time and can determine an average integer matrix on the basis of Average Q instead of determining an initial integer matrix on the basis of Q.

When the receiving apparatus 120 determines an integer matrix after performing step 860 to be described below, it can determine first a channel matrix according to an SIC performed in step 860. The newly determined matrix channel may have a smaller size than the previous channel matrix by the SIC. The receiving apparatus 120 can determine an integer matrix from the down-sized channel matrix. The newly determined integer matrix may also have a smaller size than the integer matrix in the previous operation cycle. Since a stream (or symbol) is removed by the SIC, the number of columns of the integer matrix is necessarily reduced.

In step 830, the receiving apparatus 120 can determine whether there is a row, in which only one element is not 0, in the rows of the integer matrix. The fact that there is a row, in which only one element is not 0, in the integer matrix means that there is a stream that is not interfered with by other streams of a plurality of streams. That is, in order to detect symbol-sums through the IF technique, the receiving apparatus 120 can find out that not symbol-sums, but individual symbols are detected, from the detection result on a specific receiving antenna.

The receiving apparatus 120 can perform step 840 when there is a row, in which only one element is not 0, in the integer matrix. However, when there is no row, in which only one element is not 0 in the integer matrix, the receiving apparatus 120 can perform step 870. The finally determined integer matrix is an integer matrix determined in step 820 in the final operation cycle.

In step 840, the receiving apparatus 120 can identify a row, in which only one element is not 0, in the rows of the integer matrix. The receiving apparatus 120 can determine an individual stream that is not interfered with by other streams by identifying the row in which only one element is not 0. For example, when only the second element of the third row in a 4×4 matrix is 0, the receiving apparatus 120 can identify the third row. The receiving apparatus 120 can determine the second stream of the third receiving antenna as an individual stream.

In step 850, the receiving apparatus 120 can decode a stream corresponding to the identified row. The stream corresponding to the identified row is not interfered with by other streams, so it may be a stream that can be individually decoded. For example, the receiving apparatus 120 can perform SISO decoding on the second stream of the third receiving antenna.

In step 860, the receiving apparatus 120 can perform an SIC of the stream on the received signal. The receiving apparatus 120 can remove a stream successfully decoded in the signal. The SIC, which is an SIC that is performed after decoding, is a codeword SIC. In particular, the SIC is performed between streams, so it is an inter-stream codeword SIC.

In step 870, the receiving apparatus 120 can perform IF decoding. The IF decoding solution is the IF decoding shown in FIG. 3A and the receiving apparatus 120 can perform IF decoding on the basis of a given input vector and an integer matrix determined in step 820 of the previous operation cycle. The given input vector means a vector of the other symbols except for symbols removed by the inter-stream SIC in a plurality of symbols transmitted from the transmitting apparatus 110, in an initial input vector. An integer matrix cannot be changed during IF decoding, so the receiving apparatus 120 is used to perform decoding using the finally determined integer matrix. The finally determined integer matrix is referred to as a final integer matrix.

The receiving apparatus 120 can detect symbol-sums obtained by combining the other symbols through the final integer matrix. The receiving apparatus 120 can decode the symbol-sums in the summed state through an SISO decoder. The receiving apparatus 120 can determine summed codewords, including other symbol-sums other than the symbol-sums described above, for a codeword length. Thereafter, the receiving apparatus 120 can decode the summed codewords by performing SISO decoding on the streams that have not been removed through the SIC. The receiving apparatus 120 can solve a linear combination included in the summed codewords, using an inverse matrix of the final integer matrix for the summed codewords. The receiving apparatus 120 can detect the other symbols by solving the linear combination.

Though not shown in FIG. 8, in steps 840 to 850, the receiving apparatus 120 can identify a plurality of rows and decode streams corresponding to the rows. The receiving apparatus 120 can reduce complexity by removing a plurality of streams in one operation cycle.

The receiving apparatus 120 adaptively determines an integer matrix in accordance with the operation of FIG. 8, particularly, the channel state in step 820 and performs an SIC on an individual stream not interfered with in step 860, whereby it can have the capability gains of both of MMSE-SIC and IF decoding in accordance with channel change.

Figure 9:
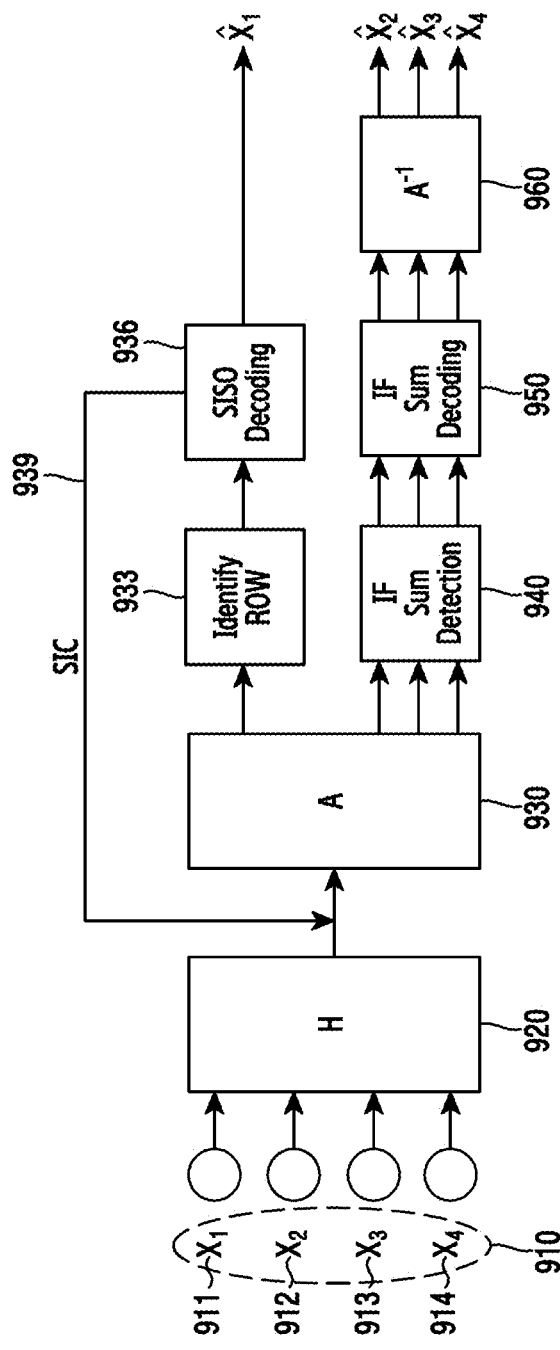
FIG. 9 shows an example of the SIC-IF decoding solution according to various embodiments.

FIG. 9 shows an example of an SIC-IF decoding solution according to various embodiments. For the convenience of description, an operation of receiving a 16 QAM symbol in a 4×4 MIMO environment in accordance with the SIC-IF decoding solution is exemplified.

Referring to FIG. 9, the transmitting apparatus 110 can transmit a plurality of streams 910 for n time units. The number of streams 910 may correspond to the number of transmitting antennas of the transmitting apparatus 110. The receiving apparatus 120 can receive a signal including noise, interference, and the streams 910 for the n time units (920). For example, the receiving apparatus 120 can receive four streams (for example, $x_1$, $x_2$, $x_3$, and $x_4$) from the transmitting apparatus 110. The streams 910 may include a first stream 911($x_1$), a second stream 912($x_2$), a third stream 913($x_4$), and a fourth stream 914($x_4$). The four streams 910 can be expressed as a 4×1 stream vector X=[$x_1$ $x_2$ $x_3$ $x_4$]. The streams 910 each may include at least one codeword. The codeword may be the unit of decoding.

The receiving apparatus 120 can determine the degree of channel change by measuring a received signal. For example, the receiving apparatus 120 can determine the degree of channel change by measuring spread diffusion or Doppler spread of a received signal. When the degree of channel change is a critical value or more, the receiving apparatus 120 can determine that the channel change is large. When the degree of channel change is less than the critical value, the receiving apparatus 120 can determine that the channel change is small. The SIC-IF decoding solution is described separately when the degree of channel change between the transmitting apparatus 110 and the receiving apparatus 120 is large and small.

When the degree of channel change is small, the receiving apparatus 120 can determine an initial integer matrix in accordance with the common IF technique described with reference to FIG. 3A or 3B (for example, Equation 4) (930).

The receiving apparatus 120 can determine whether there is a row, in which only one element is not 0, in a plurality of rows of the initial integer matrix. When there is no row, which only one element is not 0, in the initial integer matrix, the receiving apparatus 120 can decode the streams by performing the IF decoding of FIG. 3A. The receiving apparatus 120 can end decoding.

In contrast, when there is a row, in which only one element is not 0, in the initial integer matrix, the receiving apparatus 120 can identify the row, in which only one element is not 0, in the rows of the initial integer matrix (933). For example, the receiving apparatus 120 can identify the second row in the matrix of the following Equation 11.

$$\begin{pmatrix} 3 & 1 & 0 & 1 \\ 0 & 0 & 0 & 1 \\ 7 & 2 & 1 & 3 \\ 6 & 0 & 1 & 4 \end{pmatrix} \quad \text{Equation 11}$$

Referring to Equation 7, the receiving apparatus 120 outputs a mixed stream (or a symbol sum or a summed codeword), but an individual stream (or a symbol or a codeword) as the result of detecting a symbol corresponding to the row in which only one element is not 0. For example, the receiving apparatus 120 can output only a fourth stream 914($x_4$) from the second row of the product of the initial integer matrix and the stream vector X.

When receiving a stream through a second receiving antenna, the stream is not interfered with by other streams and is not a mixed stream, so the receiving apparatus 120 can perform SISO decoding on the fourth stream 914($x_4$) (936).

Unlike Equation 11, when there are two or more rows in which only one element is 0 in an initial integer state, the receiving apparatus 120 can adaptively perform SIC, depending on the requested complexity or capability.

In some embodiments, the receiving apparatus 120 can additionally identify the row having the highest signal quality in the rows in which only one element is 0. The signal intensity, for example, the reception quality may be a Signal to Interference and Noise Ratio (SINR), a Carrier to Interference and Noise Ratio (CINR), or an SNR. The receiving apparatus 120 can identify the row having the largest effective SNR of the row in which only one element is 0, and then perform SISO decoding. The receiving apparatus 120 can increase the capacity by removing rows, in which SISO decoding is not performed, in the rows in which only one element is 0, in the next repetitive operation.

In some other embodiments, unlike that shown in FIG. 9, the receiving apparatus 120 can perform SISO decoding on all of the rows in which only one element is 0. The receiving apparatus 120 can reduce complexity and latency time, as compared with performing SISO decoding on only one row and repeating this process, by performing SISO decoding on a plurality of rows in one repetitive cycle.

The receiving apparatus 120 can remove the stream to which the SISO decoding has been applied from a received signal (939) and can remove a column corresponding to the stream from a channel matrix for the stream vector. The SIC of removing the stream that has been decoded corresponds to the inter-stream codeword SIC. The receiving apparatus 120 can determine a new linear integer matrix on the basis of the down-sized channel matrix (930). An integer matrix determined by n repetitions is referred to as an n-th order integer matrix. The receiving apparatus 120 can determine whether there is a row, in which only one element is not 0, in a plurality of rows of the linear integer matrix.

The receiving apparatus 120 can repeat the operations described above by determining whether there is a row, in which only one element is not 0, in the rows of the linear integer matrix.

In some embodiments, unlike the method described above, the receiving apparatus 120 may determine a final integer matrix after removing all streams corresponding to rows in which only one element is not 0 from the initial integer matrix, instead of repeatedly determining integer matrixes. The receiving apparatus 120 can reduce complexity and latency time by reducing the number of times of calculation for determining integer matrixes.

When the receiving apparatus 120 determines that there is no row in which only one element is not 0 in the integer matrixes that are repeatedly determined, it can perform the IF decoding shown in FIG. 3A on the basis of the finally determined integer matrix. The size of the finally determined integer matrix may be reduced as much as the number of times of repeatedly determining integer matrixes. For example, when an initial integer matrix is a 4×4 integer matrix, the receiving apparatus 120 can determine a 4×2 final integer matrix through two repeated operations. In an embodiment, the final integer matrix may have a size of 2×2 through additional matrix transformation. The size of the input stream vector may be reduced from four streams to three streams and from three streams to two streams. In detail, the receiving apparatus 120 can detect the sum of remaining streams that have not been decoded, that is, mixed streams (940) and decode the mixed streams (950). The decoding can be performed by a SISO decoder. The receiving apparatus 120 can restore the original streams by solving the linear combination obtained by the result of decoding the mixed streams (960).

When the degree of channel change is large, the receiving apparatus 120 can determine an average integer matrix on the basis of the average value of a cost function matrix. The receiving apparatus 120 can determine the average value of the cost function matrix from Equation 10 (930).

The receiving apparatus 120 can determine whether there is a row, in which only one element is not 0, in a plurality of rows of the average integer matrix. When there is no row in which only one element is not 0 in the average integer matrix, similar to the case in which the degree of channel change is small, the receiving apparatus 120 can decode the streams through the IF technique (950). The receiving apparatus 120 can end decoding. In contrast, when there is a row, in which only one element is not 0, in the average integer matrix, the receiving apparatus 120 can identify the row, in which only one element is not 0, in the rows of the average integer matrix (933).

The receiving apparatus 120 can perform MMSE-SIC on a stream corresponding to the identified row. The receiving apparatus 120 can perform MMSE-SIC by adaptively determining matrixes in accordance with channel change. For example, the receiving apparatus 120 can remove a third stream $913(x_3)$ from a received stream vector X. The receiving apparatus 120 can determine a new average integer matrix on the basis of the down-sized channel matrix after performing the MMSE-SIC (930). An average integer matrix determined by n repetitions is referred to as an n-th order average integer matrix. That is, a new average integer matrix that is determined after the MMSE-SIC is performed is referred to as a linear average integer matrix.

The receiving apparatus 120 can determine whether there is a row, in which only one element is not 0, in the linear average integer matrix. The receiving apparatus 120 can perform the MMSE-SIC when there is a row in which only one element is not 0 (933, 936, and 939). The receiving apparatus 120 can determine an n-th order average integer matrix by repeating this process. The current channel state is applied every time a new average integer matrix is determined, and the receiving apparatus 120 can successfully decode streams even if the degree of channel change is large. When there is no row, in which only one element is not 0, in the n-th order average integer matrix, the receiving apparatus 120 can decode remaining streams through the IF technique based on the n-th order average integer matrix (940 and 950). For example, when only one stream (for example, a first stream $911(x_1)$) of four streams has been decoded, the receiving apparatus 120 can detect three streams by decoding three summed streams (for example, a second stream $912(x_2)$, a third stream $912(x_3)$, and a fourth stream $912(x_4)$) (950) and then solving a linear combination (960).

Meanwhile, the description referring to FIG. 9 was based on streams, but decoding may be performed in units of a codeword. Accordingly, the operation of actually decoding streams may be composed of sequential codeword decoding from a level 1 to a level L (L is the maximum bit number of one symbol). Further, the operation of removing streams may also include operations of sequentially removing codewords from the level 1 to the level L. The removal operation is referred to as an inter-stream codeword SIC.

By adaptively applying channel change to integer matrixes in accordance with the SIC-IF decoding solution, the receiving apparatus 120 can have a better and more robust capability gain against channel change in comparison to the IF decoding solution shown in FIG. 3A. In other words, the smaller the channel correlation, the larger the channel change, or the larger the modulation order, the higher capability gain the receiving apparatus 120 can obtain in comparison to the IF decoding solution. This is because the less the channel correlation, the larger the channel change, or the larger the modulation order, the more advantageous the existing MMSE-SIC in terms of capability.

IF Detection & SIC

Figure 10:
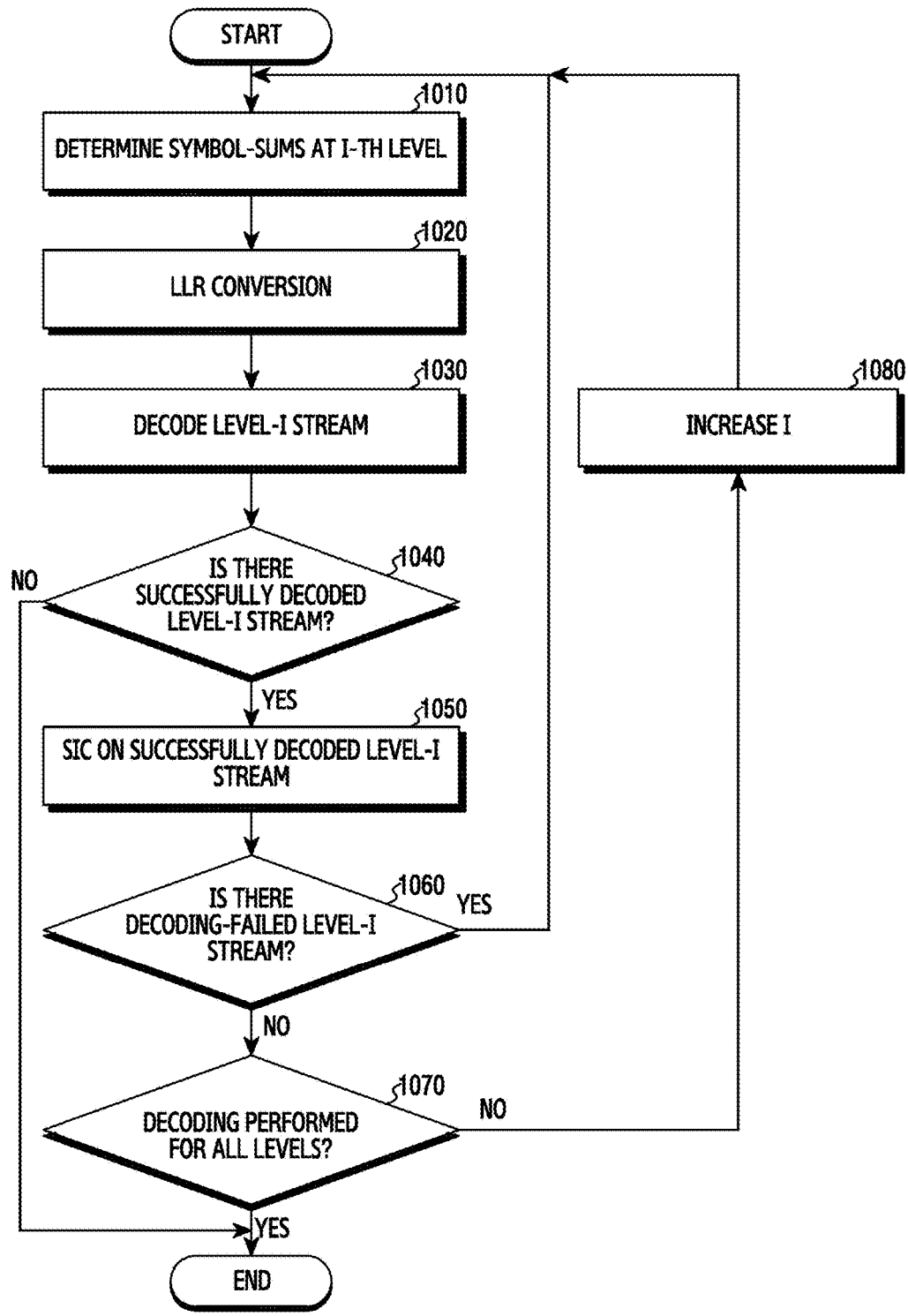
FIG. 10 shows an operation flow for performing a SIC-IF detection solution in a wireless communication system according to various embodiments.

FIG. 10 shows operation flow for performing an SIC-IF detection solution in a wireless communication system according to various embodiments. The receiving apparatus 120 shown in FIG. 1 can perform the SIC-IF detection solution to detect streams. The SIC-IF detection solution means a solution that removes successfully decoded codewords from codewords at a specific level in the IF detection solution.

Referring to FIG. 10, in step 1010, the receiving apparatus 120 can determine symbol-sums at an i-th level. The symbol-sums at the i-th level mean level-i bit-sums. A 'level-i symbol' may be used as the same meaning as a 'level-i bit'. In this case, it is assumed that the receiving apparatus 120 has received a signal and determined an integer matrix from a channel matrix. In the earlier operation, the i value may be 1. The i value may be increased from 1 to L in increments of one.

The receiving apparatus 120 can determine symbol-sums at the first level (level-1 bit-sums). The receiving apparatus 120 can detect symbol-sums at a plurality of first levels for a plurality of time units. Integer matrixes for detecting the symbol-sums for the time units can be adaptively determined. Accordingly, the receiving apparatus 120 may be used to transform a plurality of integer matrixes into one integer matrix to perform decoding later or solve linear combinations such as a symbol-sums or bit-sums.

In step 1020, the receiving apparatus 120 can perform LLR transformation. In detail, the receiving apparatus 120 can transform the LLR values of symbol-sums to correspond to a transformation integer matrix in step 1010. The transformation integer matrix may be a matrix for integer matrixes according to channel change. In the receiving apparatus 120, the transformation integer matrix may be set in advance as an identity matrix. In other words, the receiving apparatus 120 can determine different integer matrixes on the basis of the transformation integer matrix. As the receiving apparatus 120 transforms the LLR values of the symbol-sums to correspond to the transformation integer matrix, the symbol-sums can be discriminated as individual symbols. Since the transformation integer matrix is an identity matrix, interference among symbols transmitted from different antennas may not be considered.

In step 1030, the receiving apparatus 120 can decode level-i streams. The level-i stream means a codeword corresponding to a i-th bit number of one or more codewords constituting a stream. A 'level-i stream' may be used as the same meaning as a 'level-i codeword'. The receiving apparatus 120 can decode a codeword corresponding to the level i of one or more codewords included in each of a plurality of streams.

In step 1040, the receiving apparatus 120 can determine whether there is a successfully decoded level-i stream. When there is a successfully decoded level-i stream, the receiving apparatus 120 can perform step 1050.

When there is no successfully decoded level-i stream, the receiving apparatus 120 can declare a decoding error and end the operation of FIG. 10.

In step 1050, the receiving apparatus 120 can perform SIC on a successfully decoded level-i stream. The receiving apparatus 120 can perform SIC on some successfully decoded level-i streams of a plurality of level-i streams. SIC is performed on some streams, so it may be an inter-stream codeword SIC. Further, SIC is performed at a specific level, so it may be codeword level SIC. Since the receiving apparatus 120 performs SIC, the channel matrix of a signal may be changed.

In step 1060, the receiving apparatus 120 can determine whether there is a decoding-failed level-i stream. When there is a decoding-failed level-i stream, the receiving apparatus 120 can return to step 1010 and repeat steps 1010 to 1060. It is assumed in the repetition that the successfully decoded level-i streams have been removed from all streams in step 1050. When there is no decoding-failed level-i stream, the receiving apparatus 120 can perform step 1070.

In step 1070, the receiving apparatus 120 can determine whether streams at all levels have been decoded. In other words, the receiving apparatus 120 can determine whether the current i value is the maximum value. It is possible to determine whether the current i value is L. L means the bit numbers that are mapped to one symbol. For example, the L value for a 16 QAM symbol may be 4. When the streams at all levels have not been decoded, that is, when the current i value is smaller than L, the receiving apparatus 120 can perform step 1080. When the streams at all levels have been decoded, that is, when the current i value is L, it means that all streams have been decoded, so the receiving apparatus 120 can end the operation of FIG. 10.

In step 1080, the receiving apparatus 120 can increase the i value. The receiving apparatus 120 can increase the i value in increments of one in units of a natural number. For example, the receiving apparatus 120 can increase the i value from 3 to 4.

The receiving apparatus 120 can have higher capability than the existing reception solution by performing an SIC even if only some of level-i streams are successfully decoded in the operation, that is, in step 1050 of FIG. 10. The capability can be measured in accordance with one of an EVM, a BER, and a BLER.

Figure 11:
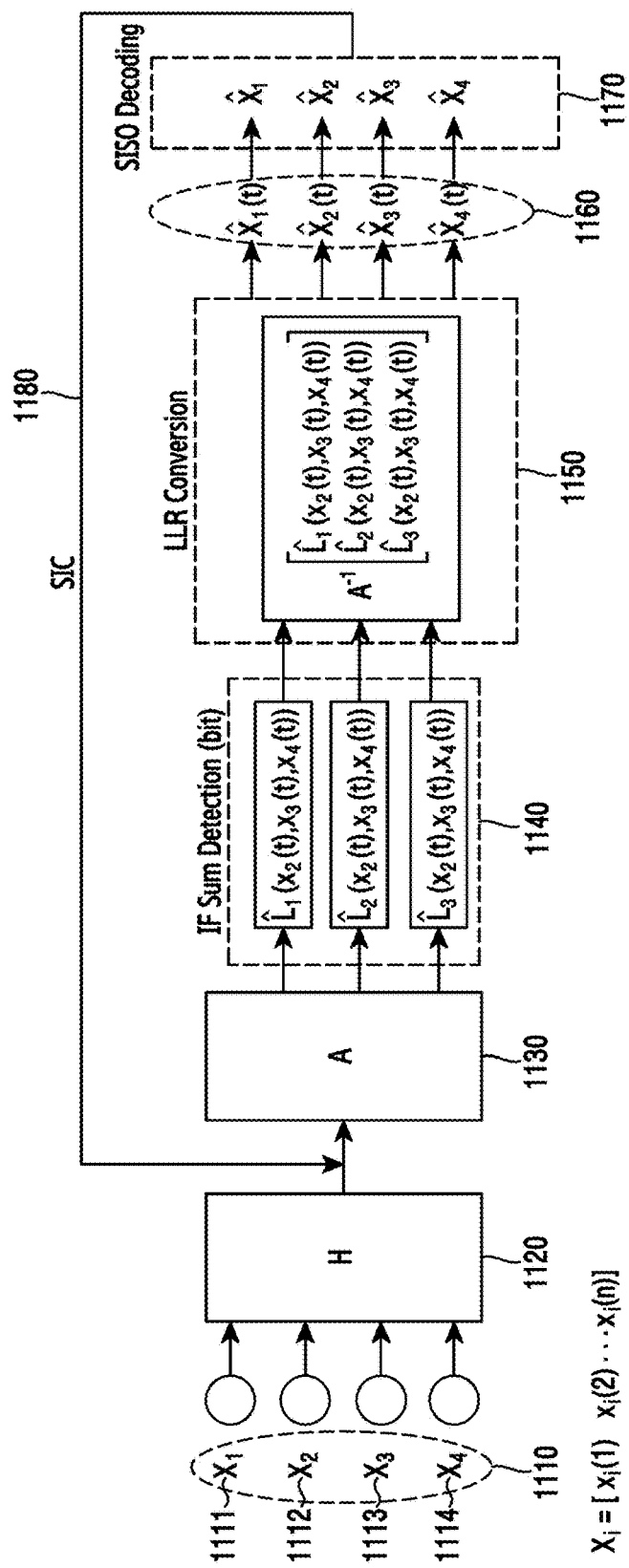
FIG. 11 shows an example of the SIC-IF detection solution according to various embodiments.

FIG. 11 shows an example of an SIC-IF detection solution according to various embodiments. For the convenience of description, an operation of receiving a 16 QAM symbol in a 4×4 MIMO environment in accordance with the SIC-IF detection solution is exemplified.

Referring to FIG. 11, the transmitting apparatus 110 can transmit signals including a plurality of streams 1110 ($x_1$, $x_2$, $x_3$, and $x_4$) for n time units. The receiving apparatus 120 can receive a signal including noise with the above-mentioned signal through a channel for the n time units (1120). The streams 1110 may include a first stream 1111($x_1$), a second stream 1112($x_2$), a third stream 1113($x_4$), and a fourth stream 1114($x_4$). The four streams 1110 can be expressed as a 4×1 stream vector X=[$x_1$ $x_2$ $x_3$ $x_4$]. One symbol $x_i(t)$ is a symbol that is transmitted at an t-th time unit of a stream that is transmitted through an i-th transmitting antenna. When the symbol is a 16 QAM symbol, it may be composed of four bits.

The receiving apparatus 120 can perform IF detection shown in FIG. 3B on the symbols received at the time unit t. At the time unit t, the symbol included in the first stream 1111 is referred to as a first symbol $x_1(t)$, the symbol included in the second stream 1112 is referred to as a second symbol $x_2(t)$, the symbol included in the third stream 1113 is referred to as a third symbol $x_3(t)$, and the symbol included in the fourth stream 1114 is referred to as a fourth symbol $x_4(t)$. The symbols can be expressed as a symbol vector X(t)=[($x_1(t)$) ($x_2(t)$) ($x_3(t)$) ($x_4(t)$)].

The receiving apparatus 120 can determine integer matrixes for channel through which the streams are transmitted (1130). Thereafter, the receiving apparatus 120 can perform sum-detection on the first bit, that is, the level-1 bit of each symbol of a received signal on the basis of the integer matrixes. The receiving apparatus 120 can detect symbol-sums for the level-1 bits of the symbols (1140). The symbol-sums for the level-1 bits means bit-sums.

For example, the receiving apparatus 120 can determine an integer matrix $A_t$ at the time unit t. The receiving apparatus 120 can calculate symbol-sums, using the integer matrix $A_t$. The symbol-sums are linearly summed values of bits at a specific level of symbols (or corresponding symbols). For example, the receiving apparatus 120 can calculate symbol-sums $L_1\{x_1(t), x_2(t), x_3(t), x_4(t)\}$, $L_2\{x_1(t), x_2(t), x_3(t), x_4(t)\}$, $L_3\{x_1(t), x_2(t), x_3(t), x_4(t)\}$, and $L_4\{x_1(t), x_2(t), x_3(t), x_4(t)\}$ that are symbol-sums corresponding to a plurality of symbols at the time unit t (1140). When a signal is transmitted from the transmitting apparatus 110 in accordance with an MLC solution, the receiving apparatus 120 can calculate the symbol-sums by repeatedly operating in units of a bit.

The receiving apparatus 120 can perform LLR transformation on the level-1 symbol-sums after performing the sum-detection (1150). A transformation integer matrix that is determined for the LLR transformation may be set as an identity matrix. The receiving apparatus 120 may be set such that the transformation integer matrix is an identity matrix. The receiving apparatus 120 can detect the first bits of not symbol-sums, but individual symbols, through the LLR transformation (1160). Thereafter, the receiving apparatus 120 can perform codeword decoding on receiving antennas of the receiving apparatus 120 by detecting level-1 bits of symbols that are received after the t+1 time unit (1170).

The receiving apparatus 120 can perform a stream SIC on successfully decoded codewords (1180). For example, it is assumed in the following description that when the receiving apparatus 120 receives four codewords through four receiving antennas, level-1 codewords corresponding to the first receiving antenna and the third receiving antenna of the four codewords have been successfully decoded. The receiving apparatus 120 can perform SIC on two successfully decoded level-1 codewords in a received signal. That is, the receiving apparatus 120 can perform inter-stream codeword SIC on the two successfully decoded codewords. SIC is performed on the level-1, so the SIC may be codeword level SIC.

The receiving apparatus 120 can repeatedly perform the sum-detection on the level-1 codewords corresponding to the decoding-failed second receiving antenna and fourth receiving antenna. When there is no successfully decoded codeword, the receiving apparatus 120 can declare a decoding error and end the operation.

When the receiving apparatus 120 has decoded all level-1 codewords, it can perform codeword level SIC. That is, the receiving apparatus 120 can remove the level-1 bits of the codewords in all received codewords. The receiving apparatus 120 can repeatedly perform the operations on level-2 bits and level-2 codewords. In the same way, the receiving apparatus 120 can repeatedly perform the operations until the bits of all levels are successively decoded.

Since the receiving apparatus 120 first removes the successfully decoded codewords, that is, performs inter-stream codeword SIC in accordance with the SIC-IF detection solution, it can achieve a higher capability gain than the IF detection solution shown in FIG. 3B. Further, since the receiving apparatus 120 can adaptively change integer matrixes through sum-detection, it can be more robust against channel change than the IF decoding solution.

As described above, the receiving apparatus 120 can perform receiving in a MIMO environment, using any one of IF decoding, IF detection, ML-IF detection, SIC-IF decoding, and SIC-IF detection. According to various embodiments, the receiving apparatus 120 can have the ability to support any one of the reception schemes or a plurality of reception schemes. When supporting a plurality of reception schemes, the receiving apparatus 120 can select a reception solution, depending on signaling with the transmitting apparatus 110 or a set type. An embodiment of signaling for selecting a reception solution is described hereafter with reference to FIG. 12.

Figure 12:
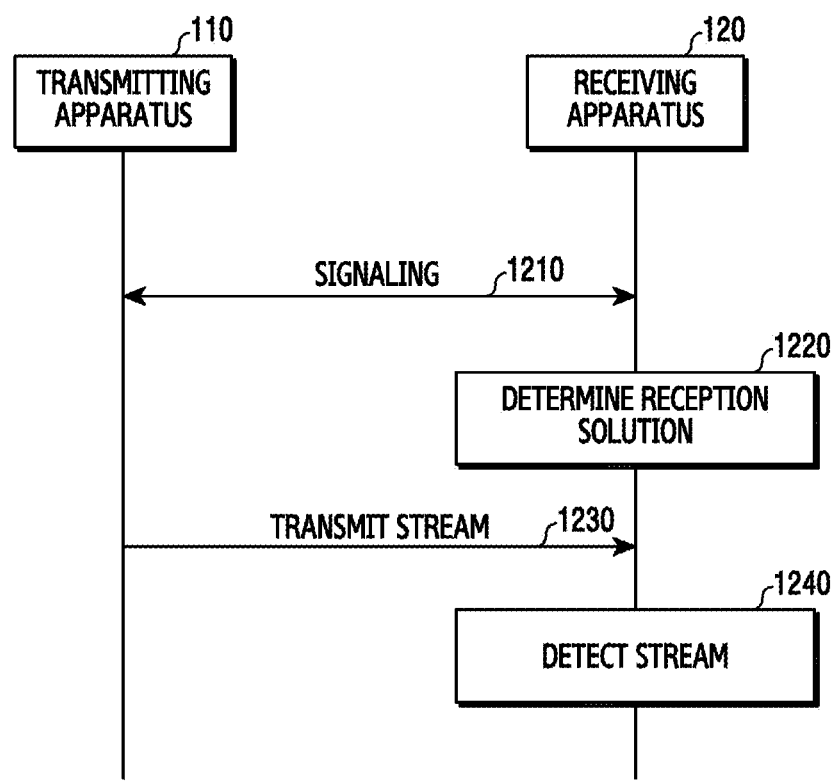
FIG. 12 shows signaling between a transmitting apparatus and a receiving apparatus for determining a reception solution in a wireless communication system according to various embodiments.

FIG. 12 shows signaling between the transmitting apparatus 110 and the receiving apparatus 120 for determining a reception solution in a wireless communication system according to various embodiments.

Referring to FIG. 12, in step 1210, the transmitting apparatus 110 and the receiving apparatus 120 can perform signaling for determining a reception solution. For example, one or more of information about a coded modulation type, information about a bit-to-symbol mapping type, information showing the degree of channel change, and information showing channel correlation of MIMO channels can be exchanged through signaling.

In some embodiments, the transmitting apparatus 110 and the receiving apparatus 120 can perform signaling to share information about a coded modulation type and a bit-to-symbol mapping type that are used for a signal to be transmitted. The coded modulation type may be MLC or BICM. The bit-to-symbol mapping type may be natural mapping or gray mapping. For example, the transmitting apparatus 110 can transmit the information about the coded modulation type and the bit-to-symbol mapping type used in the transmitting apparatus 110 to the receiving apparatus 120. Alternatively, the receiving apparatus 120 may transmit capability information to the transmitting apparatus 110 before data is transmitted from the transmitting apparatus 110. The capability information may include the information about the coded modulation type or the bit-to-symbol mapping type. Alternatively, the transmitting apparatus 110 and the receiving apparatus 120 can set at least one of the coded modulation type and the bit-to-symbol mapping type in a predetermined type.

In some other embodiments, the transmitting apparatus 110 and the receiving apparatus 120 can signal information showing the degree of channel change. The degree of channel change may include channel information according to a frequency or information about channel change according to time. As the metric showing the channel change, delay spread, Doppler spread, propagation delay, an SNR, an SINR, a CINR, or frequency offset may be used. The transmitting apparatus 110 can estimate the degree of channel change, using a reference signal, and then transmit the estimation result to the receiving apparatus 120. Though not shown in FIG. 12, the receiving apparatus 120 may measure the degree of channel change, using the reference signal.

In some other embodiments, the transmitting apparatus 110 and the receiving apparatus 120 can signal information showing correlation of MIMO channels. The channel correlation shows the relation degree of streams transmitted through separate antennas in a MIMO environment. For example, the lower the channel correlation, the less interference the streams can be transmitted with through respective antennas. On the contrary, the higher the channel correlation, the more the streams are overlapped in transmission through respective antennas. The transmitting apparatus 110 may measure the channel correlation and transmit the measurement result to the receiving apparatus 120 or the receiving apparatus 120 may measure the channel correlation. The channel correlation can be determined by measuring angular spread, the condition number of estimated channel matrixes, or the number of effective paths.

In step 1220, the receiving apparatus 120 can determine a supportable reception solution. In this case, step 1210 may be an operation of providing information for determining a reception solution from the transmitting apparatus 110 to the receiving apparatus 120. Alternatively, the transmitting apparatus 110 may determine a reception solution. In this case, step 1210 may be an operation of providing information for determining a reception solution from the receiving apparatus 120 to the transmitting apparatus 110.

In some embodiments, the receiving apparatus 120 can determine a supportable reception solution in accordance with the provided coded modulation type and bit-to-symbol mapping type. For example, when the coded modulation type is BCIM and the bit-to-symbol mapping type is gray mapping, the receiving apparatus 120 can use the MMSE or MMSE-SIC solution. When the coded modulation type is BCIM and the bit-to-symbol mapping type is natural mapping, the receiving apparatus 120 can use the ML-IF detection solution shown in FIG. 11. When the coded modulation type is MLC and the bit-to-symbol mapping type is gray mapping, the receiving apparatus 120 can use the MMSE or MMSE-SIC solution. When the coded modulation type is MLC and the bit-to-symbol mapping type is gray mapping, the receiving apparatus 120 can use at least one of the IF decoding shown in FIG. 3A, the IF detection shown in FIG. 3B, the ML-IF detection solution shown in FIG. 11, the SIC-IF decoding solution shown in FIG. 9, and SIC-IF detection solution shown in FIG. 11. Although four cases were exemplified in the above description, the receiving apparatus 120 may use more various reception schemes, depending on other coded modulation types or other bit-to-symbol mapping types.

In some other embodiments, the receiving apparatus 120 can adaptively determine a reception solution in accordance with the degree of channel change. For example, when the receiving apparatus 120 determines that the degree of channel change is less than a first critical value, that is, that the channel variation is small, it can determine the IF decoding solution or the SIC-IF decoding solution as a reception solution. The IF decoding solution uses a fixed integer matrix, so it may be advantageous in terms of capability, considering a channel state of low complexity and a small variation. Further, when the receiving apparatus 120 determines that the degree of channel change is the first critical value or more and less than a second critical value, that is, that the channel variation is normal, it can determine an IF decoding solution or an SIC-IF decoding solution, which uses an average integer matrix, as a reception solution. The receiving apparatus 120 can consider influence by a channel that is changed over time, using an average integer matrix that is the average, instead of a fixed integer matrix. Further, when the receiving apparatus 120 determines that the degree of channel change is the second critical value or more, that is, that the channel variation is large, it can determine an IF detection solution, an ML-IF detection solution, or an SIC-IF detection solution as a reception solution. The receiving apparatus 120 can have a high capability gain even if the channel variation is large, by adaptively determining an integer matrix in accordance with channel change.

In some other embodiments, the receiving apparatus 120 can adaptively determine a reception solution in accordance with the degree of channel correlation (hereafter, referred to as channel correlation). For example, when the channel correlation is a critical value or more, the receiving apparatus 120 can determine a reception solution that uses the IF technique (for example, the IF detection solution, IF decoding solution, ML-IF detection solution, SIC-IF decoding solution, SIC-IF detection solution, etc.). This is because when the channel correlation is high, the inter-stream interference is increased. An increase in interference causes deterioration of the capability of the MMSE or MMSE-SIC. However, in the IF detection, the receiving apparatus 120 can have a high capability gain by reducing amplification of noise to MMSE. When the channel correlation is less than the critical value, the receiving apparatus 120 can determine the MMSE or the MMSE-SIC as a reception solution.

In step 1230, the transmitting apparatus 110 can transmit a plurality of streams to the receiving apparatus 120. The transmitting apparatus 110 can generate the streams in accordance with a predetermined type. In some embodiment, the transmitting apparatus 110 can perform MLC on information words to transmit, and obtain a plurality of symbols through natural mapping. The transmitting apparatus 110 can generate a plurality of streams including the symbols. The symbol may be a concept corresponding to one time unit and streams may be concepts corresponding to a plurality of time units. The transmitting apparatus 110 can transmit the streams through a plurality of transmitting antennas. The receiving apparatus 120 can receive the streams through a plurality of receiving antennas.

In step 1240, the receiving apparatus 120 can detect the streams received in step 1220. In some embodiments, the receiving apparatus 120 can detect the streams by decoding summed codewords and then performing combination solving calculation (an inverse matrix of an integer matrix). In some other embodiments, the receiving apparatus 120 can detect mixed streams, detect streams through a predetermined transformation integer matrix, and perform decoding. In some other embodiments, the receiving apparatus 120 can detect the streams through setting of an effective channel matrix and then perform decoding.

As described above with reference to FIGS. 1 to 12, the receiving apparatus 120 can increase the reception capability by performing additional operations or changing some operations into other operations in the existing IF reception solution. Further, the receiving apparatus 120 can operate to be robust against channel change by adaptively changing the reception solution in accordance with a channel state or required complexity.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of operating an apparatus in a multiple-input multiple-output wireless communication system, the method comprising:
   receiving a signal including a plurality of symbols corresponding to a plurality of antennas;
   obtaining an integer matrix for integer forcing (IF) based on a channel of received signal;
   identifying an antenna among the plurality of antennas based on the integer matrix, wherein the antenna corresponds to a symbol in which interference with other symbols is smallest among the plurality of symbols;
   obtaining a processed signal by performing successive interference cancellation (SIC) related to the symbol of the identified antenna to the received signal;
   obtaining symbol-sums by applying an IF equalization to the processed signal; and obtaining the plurality of symbols by decoding the symbol-sums.

2. The method of claim 1, further comprising:
identifying a first symbol candidate among a plurality of symbol candidates, as a first symbol; and
performing the SIC on the first symbol candidate in the signal.

3. The method of claim 2, further comprising:
determining a first candidate vector for the plurality of symbols based on the first symbol candidate and symbol-sums for the first symbol candidate;
determining a second candidate vector for the plurality of symbols based on a second symbol candidate and symbol-sums for the second symbol candidate;
identifying, among a plurality of candidate vectors including the first candidate vector and the second candidate vector, a candidate vector corresponding to a smallest Euclidean distance; and
detecting information words based on the identified candidate vector.

4. The method of claim 3, wherein the detecting of the information words based on the identified candidate vector comprises:
performing an SIC, using a candidate symbol for the first symbol included in the identified candidate vector;
determining a plurality of candidate vectors for at least one symbol except for the first symbol of the plurality of symbols; and
detecting the information words based on a candidate vector,
wherein each of the plurality of candidate vectors includes a second symbol selected as each of the plurality of symbol candidates, respectively, and
wherein the candidate vector corresponds to a smallest Euclidean distance among the plurality of candidate vectors for at least one symbol.

5. The method of claim 1,
wherein the
integer matrix is determined based on a first channel matrix corresponding to the channel, and
wherein the obtaining of the symbol-sums comprises:
obtaining a second channel matrix for the processed signal by excepting a column corresponding to the symbol of the identified antenna from the first channel matrix;
obtaining a matrix for the IF equalization based on the second channel matrix; and
obtaining the symbol-sums by using the matrix, and
wherein the identified antenna corresponds to a row in which other elements, except for one element, are 0 in the integer matrix.

6. The method of claim 5, wherein the integer matrix is obtained based on the first channel matrix and at least one channel matrix for at least one previously received signal.

7. The method of claim 1, further comprising:
decoding a plurality of first codewords of a plurality of streams included in the signal;
identifying a first codeword that is successfully decoded in the plurality of first codewords; and
performing an SIC by using the identified first codeword in the signal.

8. The method of claim 7, further comprising:
decoding a plurality of second codewords of the plurality of streams,
wherein the plurality of first codewords correspond to i-th bits of the plurality of symbols, and the plurality of second codewords correspond to i+1-th bits of the plurality of streams.

9. The method of claim 1, further comprising:
receiving information for determining one of a plurality of transmission/reception schemes; and
determining one of the plurality transmission/reception schemes,
wherein the information includes at least one of:
information regarding a coded modulation type,
information regarding a bit-to-symbol mapping type,
information regarding a degree of variation for a channel, or
information regarding channel correlation of a MIMO channel.

10. The method of claim 9, wherein the plurality transmission/reception schemes includes:
a first transmission/reception scheme which is determined based on the information about a coded modulation type and the information regarding a bit-to-symbol mapping type, related to the received signal;
a second transmission/reception scheme which is determined based on the information regarding the degree of the variation; and
a third transmission/reception scheme which is determined based on information regarding the channel correlation.

11. An apparatus in a multiple-input multiple-output wireless communication system, the apparatus comprising:
a plurality of antennas;
at least one transceiver; and
at least one processor operably coupled to the at least one transceiver and configured to:
receive a signal including a plurality of symbols corresponding to the plurality of antennas,
obtain an integer matrix for integer forcing (IF) based on a channel of received signal,
identify an antenna among the plurality of antennas based on the integer matrix, wherein the antenna corresponds to a symbol in which interference with other symbols is smallest among the plurality of symbols,
obtain a processed signal by:
performing a successive interference cancellation (SIC) related to the symbol of the identified antenna to the received signal;
obtaining symbol-sums by applying an IF equalization to the processed signal; and
obtaining the plurality of symbols by decoding the symbol-sums.

12. The apparatus of claim 11, wherein the at least one processor is further configured to:
identify a first symbol candidate among a plurality of symbol candidates as a first symbol, and
perform the SIC on the first symbol candidate in the signal.

13. The apparatus of claim 12, wherein the at least one processor is further configured to:
determine a first candidate vector for the plurality of symbols based on the first symbol candidate and symbol-sums for the first symbol candidate;
determine a second candidate vector for the plurality of symbols based on a second symbol candidate and symbol-sums for the second symbol candidate;

identify, among a plurality of candidate vectors including the first candidate vector and the second candidate vector, a candidate vector corresponding to a smallest Euclidean distance; and detect information words based on the identified candidate vector.

14. The apparatus of claim 13, wherein the at least one processor is, in order to detect the information words, configured to:

perform an SIC, using a candidate symbol for the first symbol included in the identified candidate vector;

determine a plurality of candidate vectors for at least one symbol except for the first symbol of the plurality of symbols; and detect the information words based on a candidate vector, wherein each of the plurality of candidate vectors includes a second symbol selected as each of the plurality of symbol candidates, respectively, and wherein the candidate vector corresponds to a smallest Euclidean distance among a plurality of candidate vectors for at least one symbol.

15. The apparatus of claim 11, wherein the integer matrix is determined based on a first channel matrix corresponding to the channel, and wherein the at least one processor is, in order to obtain the symbol-sums, configured to:

obtain a second channel matrix by excepting a column corresponding to the symbol of the identified antenna from the first channel matrix;

obtain a matrix for the IF equalization based on the second channel matrix; and obtain the symbol-sums by using the matrix, wherein the identified antenna corresponds a row in which other elements, except for one element, are 0 in the integer matrix.

16. The apparatus of claim 15, wherein the integer matrix is obtained based on the first channel matrix and at least one channel matrix for at least one previously received signal.

17. The apparatus of claim 11, wherein the at least one processor is further configured to:

decode a plurality of first codewords of a plurality of streams included in the signal, identify a first codeword that is successfully decoded in the plurality of first codewords, and perform an SIC by using the identified first codeword in the signal.

18. The apparatus of claim 17, wherein the at least one processor is further configured to decode a plurality of second codewords of the plurality of streams, wherein the plurality of first codewords correspond to i-th bits of the plurality of symbols, and the plurality of second codewords correspond i+1-th bits of the plurality of streams.

19. The apparatus of claim 11, wherein the at least one processor is further configured to:

receive information for determining one of a plurality of transmission/reception schemes; and determine one of the plurality of transmission/reception schemes, wherein the information includes at least one of:

information regarding a coded modulation type, information regarding a bit-to-symbol mapping type, information regarding a degree of variation for a channel, or information regarding channel correlation of a MIMO channel.

20. The apparatus of claim 19, wherein the plurality transmission/reception schemes includes:

a first transmission/reception scheme which is determined based on the information about a coded modulation type and the information regarding a bit-to-symbol mapping type, related to the received signal;

a second transmission/reception scheme which is determined based on the information regarding the degree of the variation; and a third transmission/reception scheme which is determined based on information regarding the channel correlation.

* * * * *